(12) United States Patent
dePaz et al.

(10) Patent No.: US 11,507,619 B2
(45) Date of Patent: Nov. 22, 2022

(54) DISPLAY APPARATUS WITH INTELLIGENT USER INTERFACE

(71) Applicant: Hisense Visual Technology Co., Ltd., Shandong (CN)

(72) Inventors: Alexander dePaz, Burlington (CA); Mohammed Selim, Oakville (CA); Clara Ghandour, Milton (CA)

(73) Assignee: Hisense Visual Technology Co., Ltd., Qingdao (CN)

( * ) Notice: Subject to any disclaimer, the term of this patent is extended or adjusted under 35 U.S.C. 154(b) by 360 days.

(21) Appl. No.: 15/985,251

(22) Filed: May 21, 2018

(65) Prior Publication Data

US 2019/0354601 A1 Nov. 21, 2019

(51) Int. Cl.
| | |
|---|---|
| G06F 16/00 | (2019.01) |
| G06F 16/783 | (2019.01) |
| G06F 3/16 | (2006.01) |
| G06F 16/58 | (2019.01) |
| G06V 20/40 | (2022.01) |

(52) U.S. Cl.
CPC .......... G06F 16/7837 (2019.01); G06F 3/167 (2013.01); G06F 16/5866 (2019.01); G06V 20/40 (2022.01)

(58) Field of Classification Search
CPC .. G06F 16/7837; G06F 16/5866; G06F 3/167; G06F 17/30; G06F 3/16; G06F 17/30864; G06F 17/30867; G06F 17/30286; G06F 17/30595; G06K 9/00711; G06K 9/00; G06Q 30/02; G06V 20/40
See application file for complete search history.

(56) References Cited

U.S. PATENT DOCUMENTS

| | | |
|---|---|---|
| 8,456,293 B1 | 6/2013 | Trundle |
| 9,082,018 B1 | 7/2015 | Laska |
| 9,277,250 B2 | 3/2016 | Mariadoss |
| 9,411,896 B2 | 8/2016 | Frank |
| 9,667,584 B2 | 5/2017 | Archibong |
| 9,756,295 B2 | 9/2017 | Patel |
| 9,980,002 B2 | 5/2018 | Yan |
| 10,057,636 B1 | 8/2018 | Nijim |
| 10,140,827 B2 | 11/2018 | Laska |
| 10,217,185 B1 | 2/2019 | Cabanero |

(Continued)

*Primary Examiner* — Ashish Thomas
*Assistant Examiner* — Suman Rajaputra
(74) *Attorney, Agent, or Firm* — Crowell & Moring LLP

(57) ABSTRACT

A display apparatus includes user input circuitry for receiving user commands and a display for displaying video content and a user interface. The video content includes metadata. The display apparatus includes a processor in communication with the user input circuitry and the display; and non-transitory computer readable media in communication with the processor that stores instruction code. The instruction code, when executed by the processor, causes the processor to receive, from the user input circuitry, a query regarding an image of the video content currently displayed on the display; and determine one or more objects of the image associated with the query based on the metadata. The processor updates the user interface to depict one or more controls, each control being associated with one of the determined one or more objects; and receives a selection of one of the controls. The processor then updates the user interface to depict information related to the selection.

17 Claims, 25 Drawing Sheets

(56) References Cited

U.S. PATENT DOCUMENTS

| | | |
|---|---|---|
| 10,440,432 B2 | 10/2019 | Strickland |
| 10,607,116 B1 | 3/2020 | Omer |
| 10,721,536 B2 | 7/2020 | Thomas |
| D893,508 S | 8/2020 | Laska |
| 10,796,157 B2 | 10/2020 | Chan |
| 10,831,268 B1 | 11/2020 | Golard |
| 2002/0073417 A1 | 6/2002 | Kondo |
| 2005/0289582 A1 | 12/2005 | Tavares |
| 2006/0116987 A1 | 6/2006 | Bernard |
| 2008/0092156 A1 | 4/2008 | Ferrone |
| 2010/0228742 A1 | 9/2010 | Vandelle |
| 2011/0029500 A1* | 2/2011 | Brown ............... G06F 16/90328 707/706 |
| 2011/0032423 A1 | 2/2011 | Jing |
| 2011/0047163 A1 | 2/2011 | Chechik |
| 2011/0069940 A1 | 3/2011 | Shimy |
| 2011/0138805 A1 | 6/2011 | Barthelet et al. |
| 2012/0060176 A1 | 3/2012 | Chai |
| 2012/0121187 A1 | 5/2012 | Lee |
| 2012/0166951 A1 | 6/2012 | Steelberg |
| 2013/0006625 A1* | 1/2013 | Gunatilake ............. G10L 17/08 704/235 |
| 2013/0027613 A1 | 1/2013 | Kim |
| 2013/0057717 A1 | 3/2013 | Chou |
| 2013/0091515 A1 | 4/2013 | Sakata |
| 2013/0173765 A1 | 7/2013 | Korbecki |
| 2013/0174195 A1* | 7/2013 | Witenstein-Weaver ..................... H04N 21/4722 725/32 |
| 2013/0205311 A1 | 8/2013 | Ramaswamy |
| 2013/0298146 A1 | 11/2013 | Conrad |
| 2014/0147020 A1 | 5/2014 | Baldwin |
| 2014/0214846 A1 | 7/2014 | Robert |
| 2014/0223548 A1 | 8/2014 | Wassingbo |
| 2014/0245335 A1 | 8/2014 | Holden |
| 2014/0306833 A1 | 10/2014 | Ricci |
| 2014/0359647 A1 | 12/2014 | Shoemake |
| 2015/0012952 A1 | 1/2015 | Sato |
| 2015/0248918 A1 | 9/2015 | Tang |
| 2015/0264299 A1 | 9/2015 | Leech |
| 2015/0382047 A1* | 12/2015 | Van Os ................ G10L 17/22 725/38 |
| 2015/0382079 A1* | 12/2015 | Lister ................ G11B 27/34 725/38 |
| 2016/0021412 A1 | 1/2016 | Zito, Jr. |
| 2016/0134938 A1 | 5/2016 | Miyazaki |
| 2016/0337710 A1 | 11/2016 | Badaan |
| 2016/0370956 A1 | 12/2016 | Penha |
| 2017/0191695 A1 | 7/2017 | Bruhn |
| 2017/0289596 A1 | 10/2017 | Krasadakis |
| 2017/0289619 A1 | 10/2017 | Xu |
| 2017/0289643 A1 | 10/2017 | Kachkova |
| 2018/0018508 A1 | 1/2018 | Tusch |
| 2018/0075593 A1 | 3/2018 | Wang |
| 2018/0089203 A1* | 3/2018 | Soni .................. G06F 16/738 |
| 2018/0146231 A1 | 5/2018 | Saeedasr |
| 2018/0192114 A1 | 7/2018 | Sirpal |
| 2018/0192127 A1 | 7/2018 | Sirpal |
| 2018/0192135 A1 | 7/2018 | Sirpal |
| 2018/0204111 A1 | 7/2018 | Zadeh |
| 2018/0232601 A1 | 8/2018 | Feng |
| 2018/0262362 A1 | 9/2018 | Goldstein |
| 2018/0301940 A1 | 10/2018 | Yeo |
| 2018/0350144 A1 | 12/2018 | Rathod |
| 2019/0034822 A1 | 1/2019 | Farre Guiu |
| 2019/0065895 A1 | 2/2019 | Wang |
| 2019/0130580 A1 | 5/2019 | Chen |
| 2019/0156122 A1 | 5/2019 | Lu |
| 2019/0354601 A1 | 11/2019 | dePaz |
| 2019/0354603 A1 | 11/2019 | Selim |
| 2019/0354608 A1 | 11/2019 | dePaz |
| 2019/0356949 A1 | 11/2019 | dePaz |
| 2020/0026922 A1 | 1/2020 | Pekelny |
| 2020/0351543 A1 | 11/2020 | Kerofsky |
| 2021/0209388 A1 | 7/2021 | Ciftci |

\* cited by examiner

DISPLAY APPARATUS WITH INTELLIGENT USER INTERFACE

BACKGROUND

Field

This application generally relates to a display apparatus such as a television. In particular, this application describes a display apparatus with an intelligent user interface.

Description of Related Art

The current breed of higher end televisions typically include network connectivity to facilitate streaming video content from content servers such as Netflix®, Hulu®, etc. In some cases, the televisions utilize operating systems such as Android® that facilitate execution of apps for other purposes.

Access to the ever-increasing number of new features requires changes to the user interface. Unfortunately, access to these newer features often times results in user interfaces that are frustratingly complex and difficult to navigate.

SUMMARY

In first aspect, a display apparatus includes a user input circuitry for receiving user commands and a display for outputting video content and a user interface. The video content includes metadata. The apparatus also includes a processor in communication with the user input circuitry and the display, and non-transitory computer readable media in communication with the processor that stores instruction code. The instruction code is executed by the processor and causes the processor to receive, from the user input circuitry, a first scene command to search for scenes in the video content of a scene type. The processor determines, from the metadata, one or more scenes in the video content related to the scene type. The processor then updates the user interface to depict one or more scene images related to the one or more scenes related to the scene type.

In a second aspect, a method for controlling a display apparatus includes receiving, via user input circuitry, user commands, outputting, via a display, video content and a user interface. The video content includes metadata. The method includes receiving, from the user input circuitry, a first scene command to search for scenes in the video content of a scene type; determining, from the metadata, one or more scenes in the video content related to the scene type; and updating the user interface to depict one or more scene images related to the one or more scenes related to the scene type.

In a third aspect, a non-transitory computer readable media that stores instruction code for controlling a display apparatus is provided. The instruction code is executable by a machine for causing the machine to receive, from user input circuitry, a first scene command to search for scenes in the video content of a scene type; determine, from metadata of video content, one or more scenes in the video content related to the scene type; and update a user interface to depict one or more scene images related to the one or more scenes related to the scene type.

DETAILED DESCRIPTION

The embodiments described below are directed to various user interface implementations that facilitate access to television features in an intelligent, easy to use manner. Generally, the user interfaces rely on various machine learning techniques that facilitate access to these features and other information with a minimum number of steps. The user interfaces are configured to be intuitive, with minimal learning time required to become proficient in navigating the user interfaces.

Figure 1:
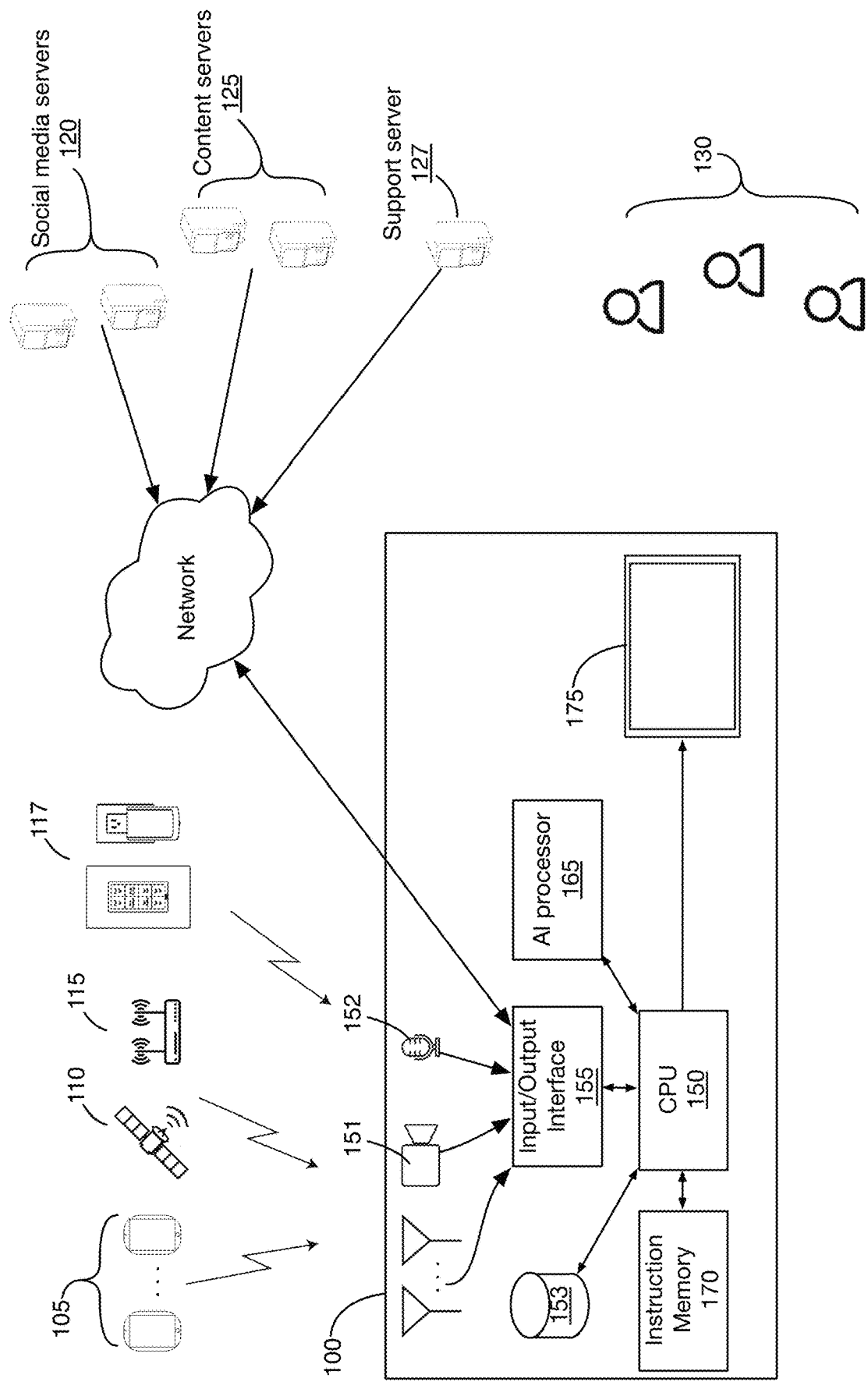
FIG. 1 illustrates an exemplary environment in which a display apparatus operates.

FIG. 1 illustrates an exemplary environment in which a display apparatus operates. Illustrated are, the display apparatus 100, a group of mobile devices 105, a GPS network 110, a computer network 115, a group of social media servers 120, a group of content servers 125, a support server 127, and one or more users that may view and/or interact with the display apparatus 100. The display apparatus 100, social media servers 120, content servers 125, and support server 127 may communicate with one another via a network 107 such as the Internet, a cable network, a satellite network, etc.

The social media servers 120 correspond generally to computer systems hosting publicly available information that may be related to the users 130 of the display apparatus 100. For example, the social media servers 120 may be Facebook®, Twitter®, LinkedIn®, etc. The social media servers 120 may include blogs, forums, and/or any other systems or websites from which information related to the users 130 may be obtained.

The mobile devices 105 may correspond to mobile phones, tablets, etc. carried by one or more of the users 130.

The mobile devices 105 may include short range communication circuitry that facilitates direct communication with the display apparatus 100. For example, the mobile devices 105 may include Bluetooth® circuitry, nearfield communication circuitry, etc. The communication circuitry facilities detection of of a given mobile device 105 when it is in the proximity of display apparatus 100. This in turn may facilitate determination, by the display apparatus 100, of the presence of a user 130 within viewing distance of the display apparatus 100.

The GPS network 110 and computer network 115 may communicate information to the display apparatus 100 that may in turn facilitate determination, by the display apparatus 100, of the general location of display apparatus 100. For example, the GPS network 110 may communication information that facilitates determining a relatively precise location of the display apparatus 100. The computer network 115 may assign an IP address to the display apparatus 100 that may be associated with a general location, such as a city or other geographic region.

The content servers 125 correspond generally to computer systems hosting video content. For example, the content servers 125 may correspond to head-end equipment operated by a cable television provider, network provider, etc. The content servers 125 may in some cases store video content such as movies, television shows, sports programs, etc.

In some cases, video content may include metadata that defines various aspects of the video content. For example, metadata associated with a sports matchup may include information timestamps, still images, etc. related to various events of the match, such as goals, penalties, etc. The metadata may include information associated with different individuals depicted in the video content such as the names of players, coaches, etc.

The metadata in the video content may include information that facilitates determining whether the video content is of a particular type (e.g., comedy, drama, sports, adventure, etc.). The metadata may include information associated with different individuals depicted in the video content such as the names of actors shown in the video content. The metadata may include information associated with different objects depicted in the video content such as garments worn by individuals, personal items carried by the individuals, and various objects that may be depicted in the video content.

The metadata may have been automatically generated beforehand by various machine learning techniques for identifying individuals, scenes, events, etc. in the video content. In addition or alternatively, the machine learning techniques may use some form of human assistance in making this determination.

The support server 127 corresponds generally to computer system configured to provide advanced services to the display apparatus 100. For example, support server 127 may correspond to high-end computer that configured to perform various machine learning technique for determining the meaning of voice commands, predicting responses to the voice commands, etc. The support server 127 may receive voice commands and other types of commands from the display apparatus 100 and communicate responses associated with the commands back to the display apparatus The display apparatus 100 may correspond to a television or other viewing device with enhanced user interface capabilities. The display apparatus 100 may include a CPU 150, a video processor 160, an I/O interface 155, an AI processor 165, a display 175, a support database 153, and instruction memory 170.

The CPU 150 may correspond to processor such as an Intel®, AMD®, ARM®, etc. based processor. The CPU 150 may execute an operating system, such as Android®, Linux®, or other operating system suitable for execution within a display apparatus. Instructions code associated with the operating system and for controlling various aspects of the display apparatus 100 may be stored within the instruction memory 170. For example, instruction code stored in the instruction memory 170 may facilitate controlling the CPU 150 to communicate information to and from the I/O interface 155. The CPU 150 may process video content received from the I/O interface 155 and communicate the processed video content to the display 175. The CPU 150 may generate various user interfaces that facilitate controlling different aspects of the display apparatus.

The I/O interface 155 is configured to interface with various types of hardware and to communicate information received from the hardware to the CPU. For example, the I/O interface 155 may be coupled to one or more antenna's that facilitate receiving information from the mobile terminals 105, GPS network 110, WIFI network 115, smart appliances 117, etc. The I/O interface may be coupled to a imager 151 arranged on the face of the display apparatus 100 to facilitate capturing images of individuals near the display apparatus. The I/O interface may be coupled to one or more microphones 152 arranged on the display apparatus 100 to facilitate capturing voice instructions that may be conveyed by the users 130.

The AI processor 165 may be correspond to a processor specifically configured to perform AI operations such as natural language processing, still and motion image processing, voice processing, etc. For example, the AI processor 165 may be configured perform voice recognition to recognize voice commands received through the microphone. The AI processor 165 may include face recognition functionality to identify individuals in images captured by the camera. In some implementations, the AI processor 165 may be configured to analyze content communicated from one or more content servers to identify objects within the content.

Exemplary operations performed by the CPU 150 and/or other modules of the display apparatus 100 in providing an intelligent user interface are illustrated below. In this regard, the operations may be implemented via instruction code stored in non-transitory computer readable media 170 that resides within the subsystems configured to cause the respective subsystems to perform the operations illustrated in the figures and discussed herein.

Figure 2:
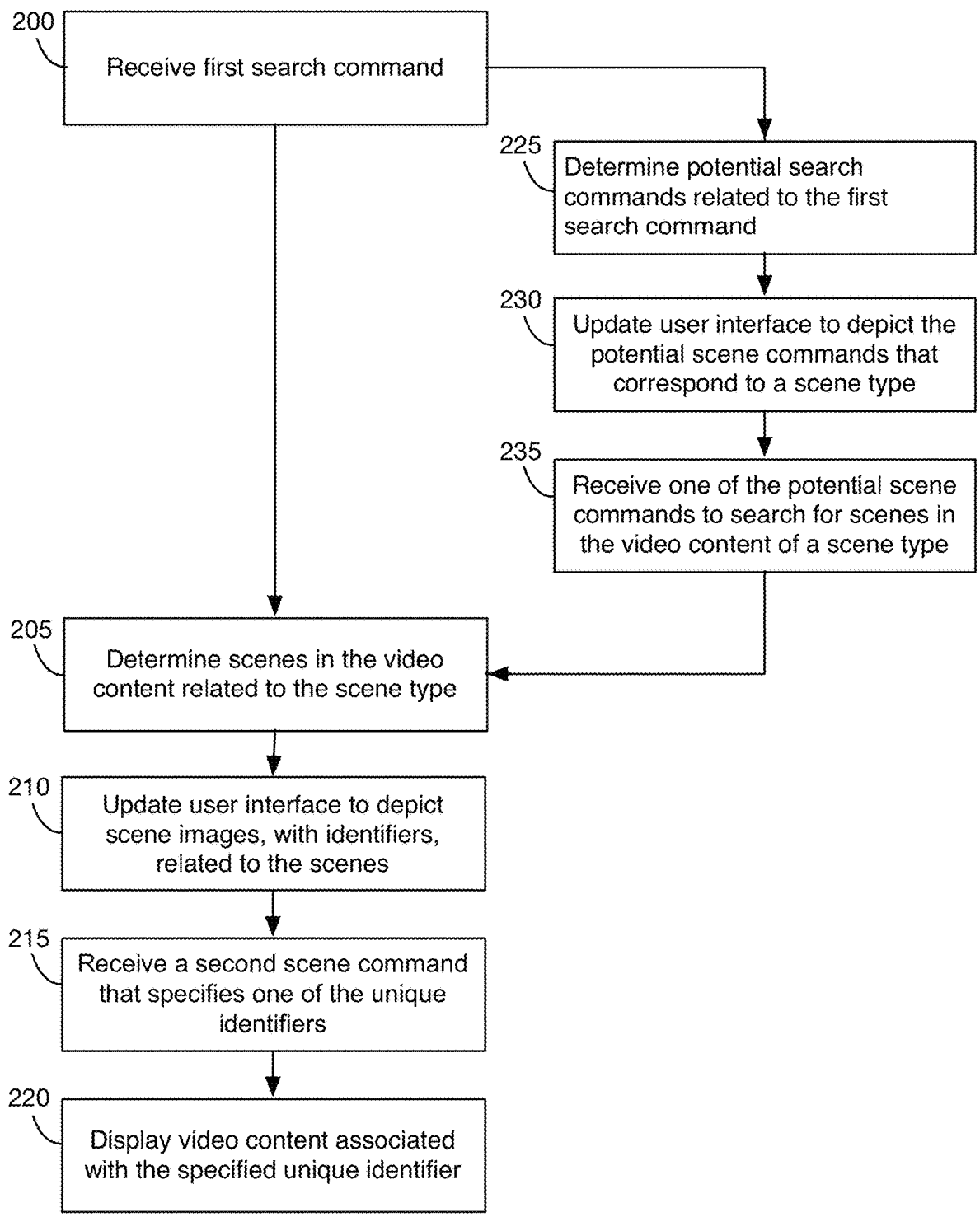
FIG. 2 illustrates exemplary operations for enhancing navigation of video content.

FIG. 2 illustrates exemplary operations for enhancing navigation of video content. The operations of FIG. 2 are better understood with reference to FIGS. 3A-3C.

Figure 3A:
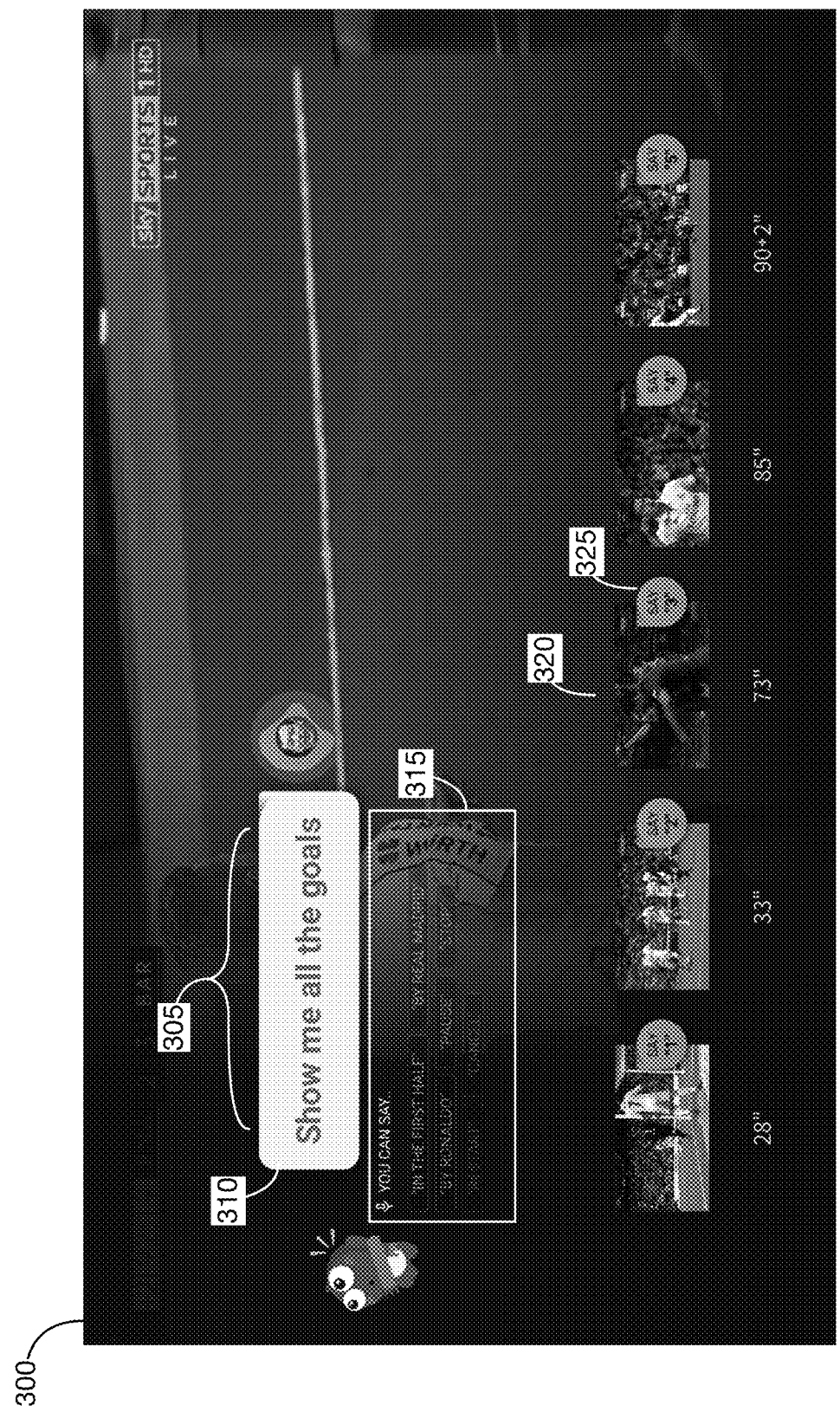
FIGS. 3A-3C illustrate exemplary user interfaces that may be presented to a user during the operations of FIG. 2.

At block 200, the display apparatus 100 may be depicting video content, such as a soccer match, as illustrated in FIG. 3A. The user 130 may then issue a first scene command 305 to the display apparatus 100 to have the display apparatus 100 search for scenes in the video content. For example, the user 130 may simply speak out loud, "show me all the goals." In this case, the natural language processor implemented by the CPU 150 alone or in cooperation with the AI processor 165 may determine the meaning of the voice command. In addition or alternatively, data associated with the voice command may be communicated to the support server 127 which may then ascertain the meaning of the voice command and convey the determined meaning back to the display apparatus.

As illustrated in FIG. 3A, in some implementations, the user interface 300 may include a phrase control 310 that is updated in real-time to depict text associated with the commands issued by the user.

At block 205, in response to the first scene command 305, the display apparatus 100 may determine scenes in the video content that are related to a type of scene associated with the first scene command 305. In this regard, the CPU 150 alone or in cooperation with the AI processor 165 may implement various machine learning techniques that utilize metadata associated with the video content to determine scenes in the video content that are related to the scene type. In addition or alternatively, the first scene command 305 may be communicated to the support server 127 and the support server 127 may determine and convey the scene type to the display apparatus 100.

At block 210, the user interface 300 of the display apparatus 100 may be updated to depict scene images 320 associated with the determined scenes. For example, images 320 from the video content metadata associated with the scenes may be displayed on the user interface 300. The images 320 may correspond to still images and/or a sequence of images or video associated with the scene.

In some implementations, the user interface 300 may be updated to display unique identifiers 325 on or near each image.

At block 215, the user 130 may specify a second scene command that specifies one of the unique identifiers 325. For example, the user 130 may specify "three" to select the scene associated with the third image 320.

Figure 3B:
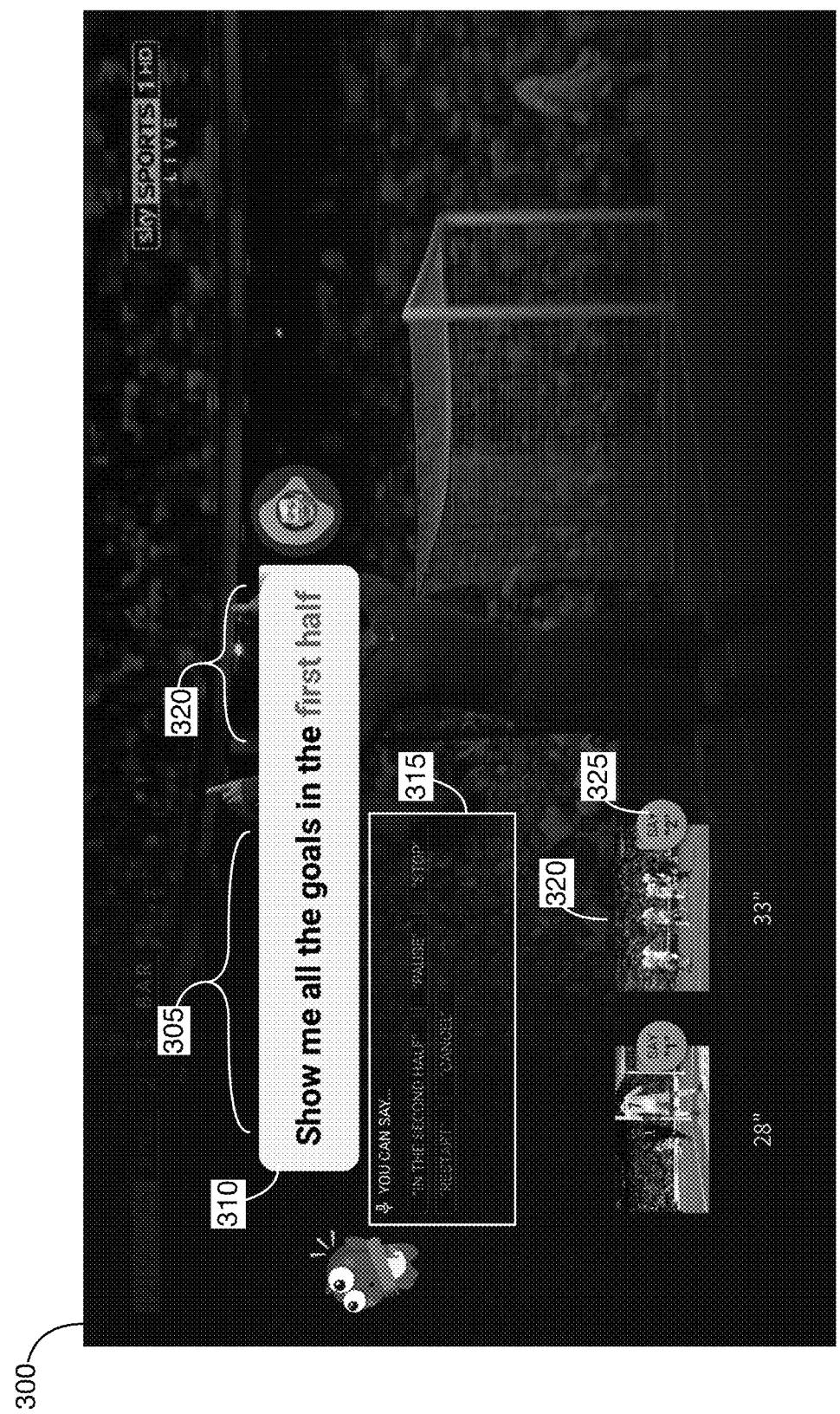
Figure 3C:

At block 220, video content associated with the specified unique identifier 325 (e.g., "three") may be displayed on the user interface 300, as illustrated in FIG. 3C.

Returning to block 200, in some implementations, the user 130 may refine a scene command by specify additional information. For example, in response to receiving the first scene command 305 at block 200, at block 225 one or more potential scene commands 315 related to the first scene command 305 may be determined. The machine learning techniques implemented by the CPU 150, AI processor 165, and/or the support server 127 may be utilized to determine the potential scene commands related to the first scene command 305. In this regard, the metadata in the video content may define a hierarchy of scene commands utilized by the machine learning techniques in determining potential scene commands related to a given first scene command 305.

At block 230, the user interface 300 may be updated to depict one or more of the potential scene commands 315, as illustrated in FIG. 3A. For example, in response to the first scene command 305 "show me all the goals," the potential scene commands "in the first half", "by real Madrid", etc. may be determined and depicted.

At block 235, the user 130 may issue one of the potential scene commands 315 to instruct the display apparatus 100 to search for scenes in the video content, as illustrated in FIG. 3B. For example, the user 130 may simply speak out loud, "in the first half." The phrase control 310 may be updated in real-time to depict text associated with the first scene command 305 and the second scene command 320.

The operations may repeat from block 205. For example, in response to the second scene command 320, the display apparatus 100 may determine scenes in the video content that are related to a type of scene associated with the first scene command 305 and the second scene command 320. In addition or alternatively, the first scene commands 305 and the second scene command 320 maybe conveyed to the support server 127 and the support server 127 may convey information that defines related scenes to the display apparatus.

It should be understood that additional scene commands beyond the first and second scene commands may be specified to facilitate narrowing down desired content. For example, after issuance of the second scene command 320, another group of potential scene commands 315 may be depicted, and so on.

Figure 4:
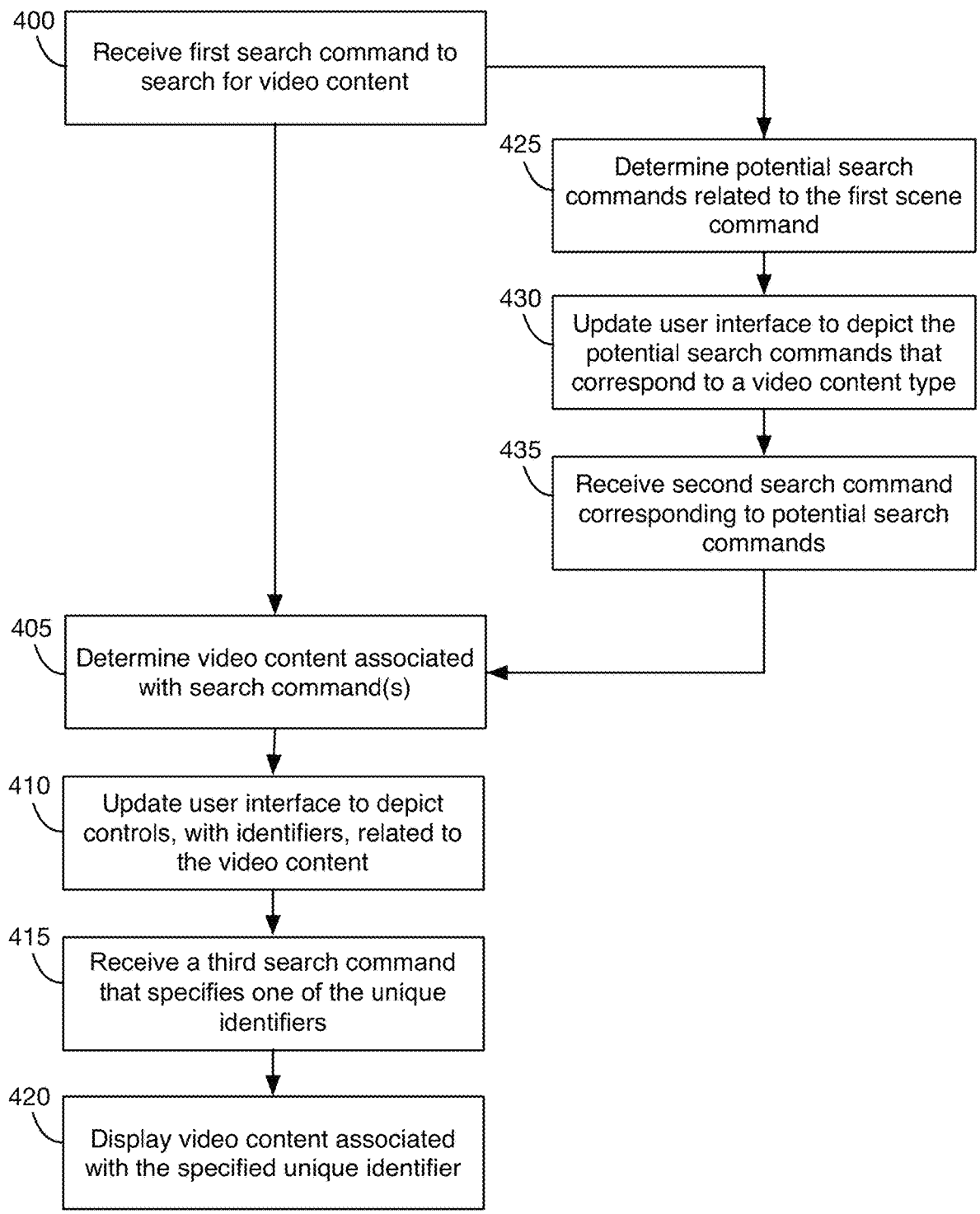
FIG. 4 illustrates exemplary operations that facilitate locating a particular type of video content.

FIG. 4 illustrates exemplary operations that facilitate locating a particular type of video content. The operations of FIG. 4 are better understood with reference to FIG. 5.

Figure 5:
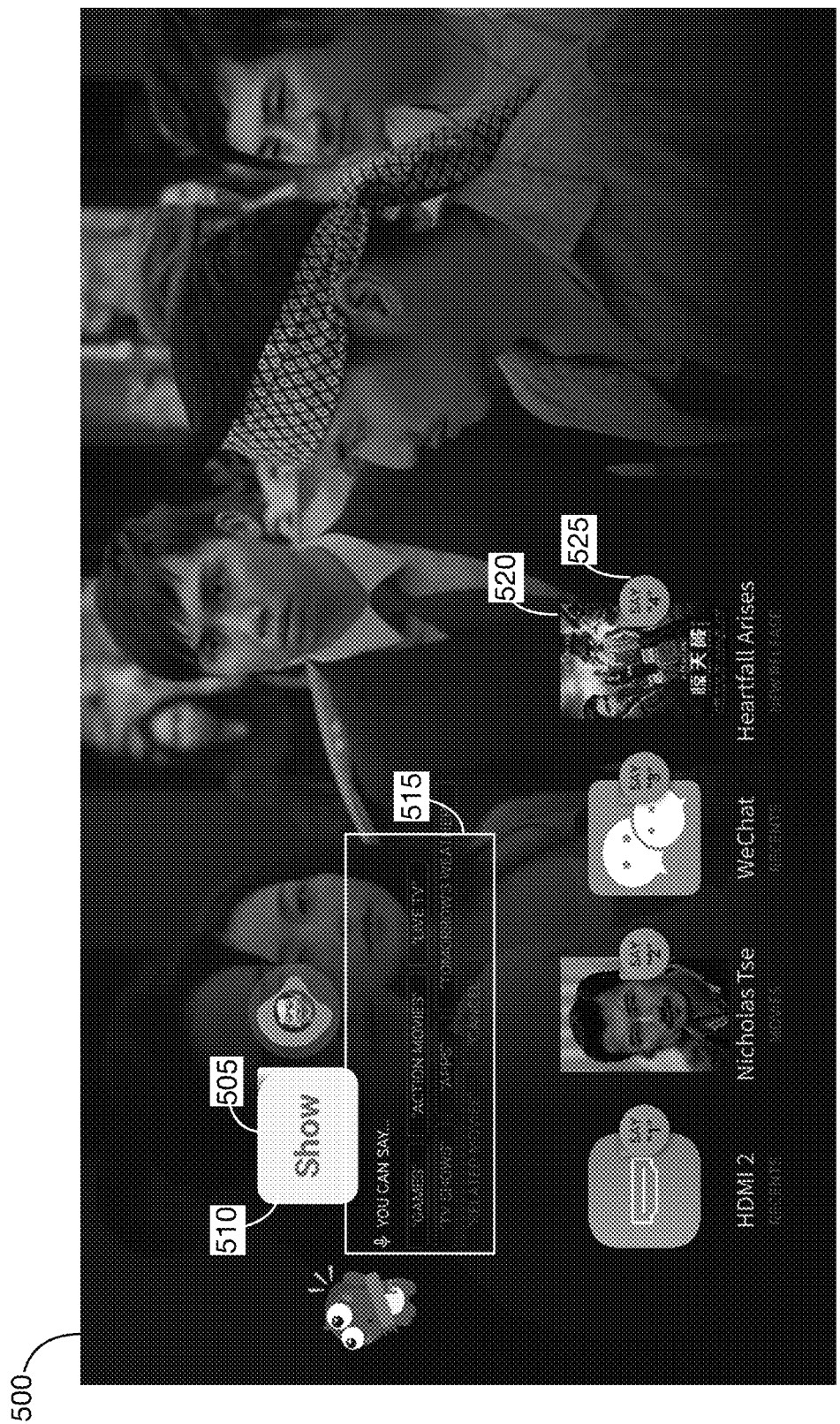
FIG. 5 illustrates an exemplary user interface that may be presented to a user during the operations of FIG. 4.

At block 400, the display apparatus 100 may be depicting video content, such as a sitcom, as illustrated in FIG. 5. The user 130 may issue a first search command 505 to the display apparatus 100 to have the display apparatus 100 search for a particular type of video content. For example, the user 130 may simply speak out loud, "show." In this case, the natural language processor implemented by the CPU 150 alone or in cooperation with the AI processor 165 may determine the meaning of the voice command. In addition or alternatively, data associated with the voice command may be communicated to the support server 127 which may then ascertain the meaning of the voice command and convey the determined meaning back to the display apparatus.

At block 405, the display apparatus 100 may determine video content that is related to the first search command 505. In this regard, the CPU 150 alone or in cooperation with the AI processor 165 may implement various machine learning techniques that utilize metadata associated with the video content to determine video content that is related to the search command. In addition or alternatively, the first search command 305 may be communicated to the support server 127 and the support server 127 may determine and convey information related to the video content that is in turn related to the first search command to the display apparatus 100.

At block 410, the user interface 500 may be updated to depict controls 520 that facilitate selecting video content. Each control may include a unique identifier 525 on or near the control 520 that facilitates selecting the control by voice. For example, a first control with the unique identifier "one" may correspond to an image that represents an input source of the display apparatus 100 that facilitates selecting video content from the input source. A second control with the unique identifier "two" may correspond to an image of an actor that, when selected, facilitates selecting video content that includes the actor. A fourth control with the unique identifier "four" may correspond to a scene from a movie that the user frequently watches or that is associated with types of shows the user 130 watches.

The machine learning techniques may determine the type of control to display based at least in part on a history of search commands and selections specified by the user that may be stored in the support database 153 of the display apparatus 100 or maintained within the support server 127. In some implementations, the support database 153 is dynamically updated to reflect the user's choices to improve the relevancy of the controls displayed to the user for subsequent request.

At block 415, the user 130 may specify a second search command that specifies one of the unique identifiers. For example, the user 130 may specify "four" to select the scene associated with the fourth image 520.

At block 420, video content associated with the specified unique identifier (e.g., "four") may be depicted on the user interface 500 of the display apparatus 100.

Returning to block 400, in some implementations, the user 130 may refine a search command by specifying additional information. For example, in response to receiving the first search command at block 400, at block 425, one or more potential second search commands 515 related to the first search command 505 may be determined. The machine learning techniques implemented by the CPU 150, AI processor 165, and/or the support server 127 may be utilized to determine the potential commands related to the first search command 505. As noted earlier, the metadata in the video content may include information that facilitates determining whether the video content is associated with a particular type of video content (e.g., comedy, drama, sports, etc.). This metadata may be utilized by the machine learning techniques in determining potential second search commands related to a given first search command.

At block 430, the user interface 500 may be updated to depict one or more of the potential search commands 515, as illustrated in FIG. 5. For example, in response to the first scene command "show," the potential search commands 515 "games", "action movies", etc. may be determined and displayed.

As described earlier, in some implementations, the user interface 500 may include a phrase control 510 that is updated in real-time to depict text associated with the commands issued by the user.

At block 435, the user 130 may issue one of the potential search commands 515 to instruct the display apparatus 100 to search for various types of video content. For example, the user 130 may simply speak out loud, "action movies." The phrase control 510 may be updated in real-time to depict text associated with the first search command 505 and the second search command 515 (e.g., "show action movies").

The operations may repeat from block 405. For example, in response to the second search command, the display apparatus 100 may determine video content that is related to the first and second search commands and display appropriate controls for selection by the user.

Figure 6:
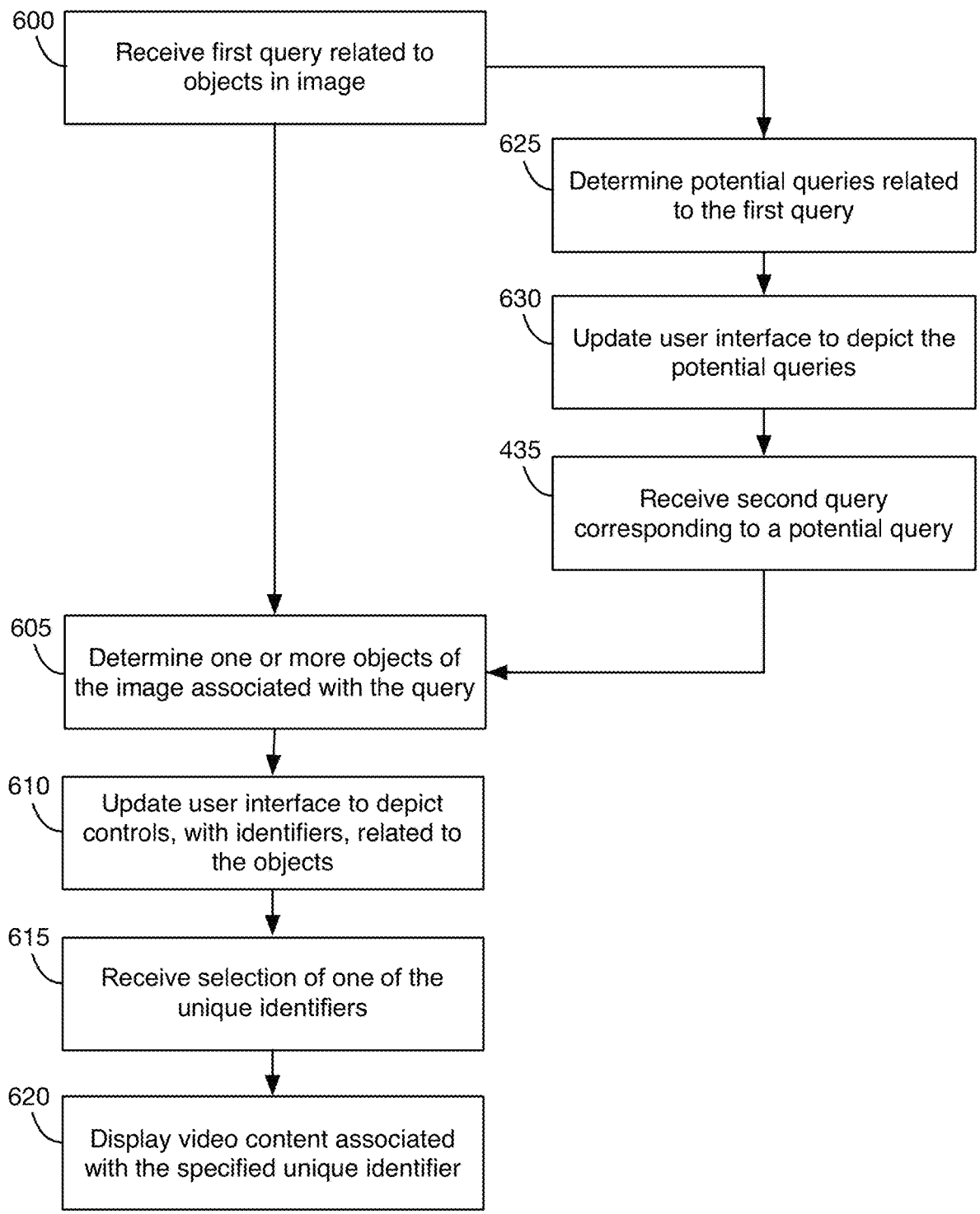
FIG. 6 illustrates exemplary operations for determining information related to images in video content.

FIG. 6 illustrates exemplary operations for determining information related to images in video content. The operations of FIG. 6 are better understood with reference to FIGS. 7A and 7B.

Figure 7A:
FIGS. 7A and 7B illustrate exemplary user interfaces that may be presented to a user during the operations of FIG. 6.

At block 600, the display apparatus 100 may be depicting video content, such as a movie, as illustrated in FIG. 7A. The user 130 may issue a first query 505 to the display apparatus 100 to have the display apparatus 100 provide information related to the query. For example, the user 130 may simply speak out loud, "who is on screen." In this case, the natural language processor implemented by the CPU 150 and/or AI processor 165 may determine the meaning of the voice command. In addition or alternatively, data associated with the voice command may be communicated to the support server 127 which may then ascertain the meaning of the voice command and convey the determined meaning back to the display apparatus 100.

At block 605, in response to the first query 505, the display apparatus 100 may determine one or more objects of the image associated with the query 505. In this regard, the CPU 150 alone or in cooperation with the AI processor 165 may implement various machine learning techniques that utilize metadata associated with the video content to determine different objects being depicted on the user interface 700 of the display apparatus 100. In addition or alternatively, the first query 505 may be communicated to the support server 127 and the support server 127 may determine and convey information related to different objects depicted on the user interface 700 to the display apparatus 100.

At block 610, the user interface 700 of the display apparatus 100 may be updated to depict controls 720 that facilitate selecting different objects. Each control may include a unique identifier 725 on or near each control 720 that facilitates selecting the control by voice. For example, controls for each actor may be depicted in the user interface 700.

At block 615, the user 130 may select one of the unique identifiers 725. For example, the user 130 may specify "two" to select a particular actor.

Figure 7B:
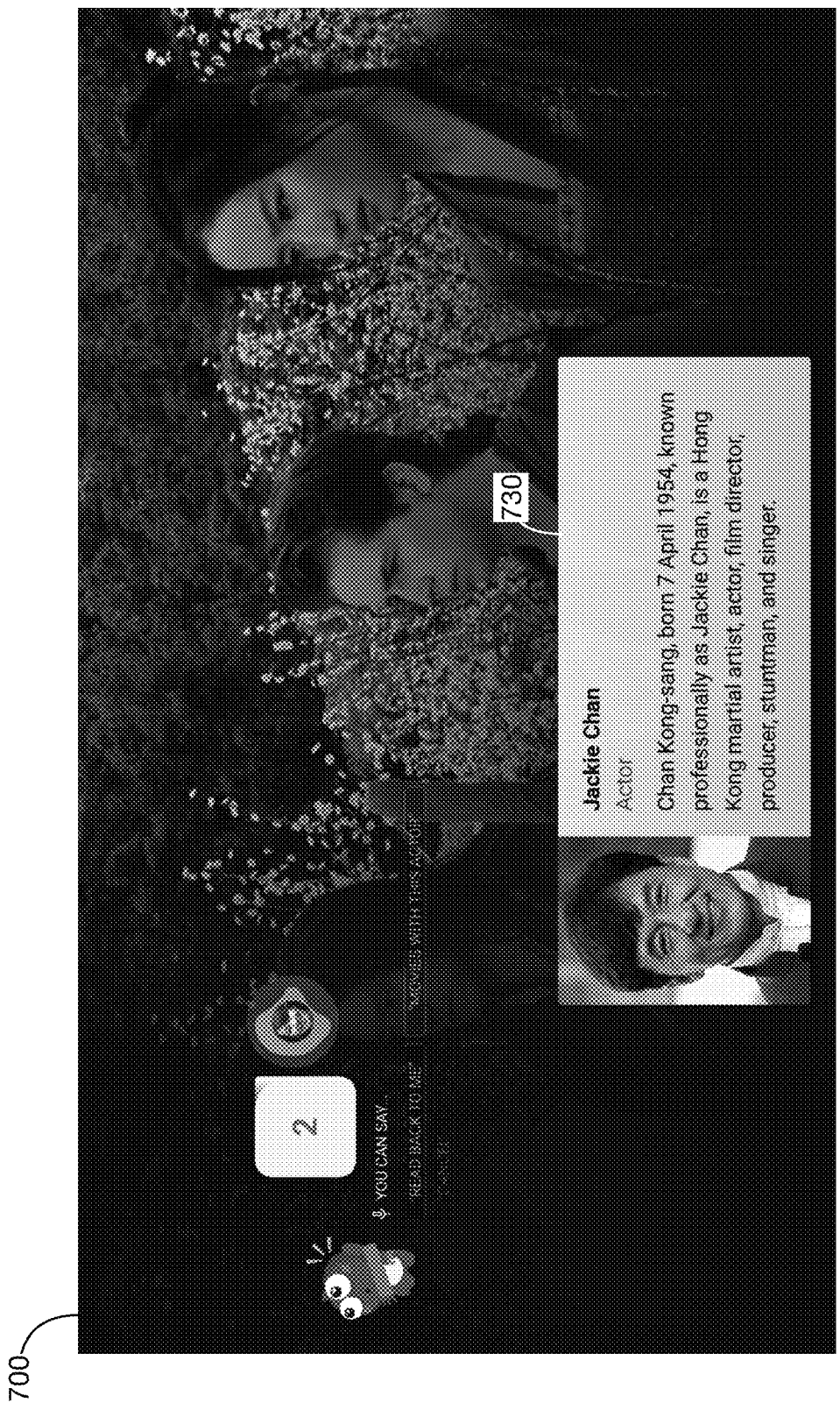

At block 620, the user interface 700 may be updated to depict information related to the selection. For example, as illustrated in FIG. 7B, an informational control 730 with information related to the selected actor may be provided.

Returning to block 605, in some implementations, the user 130 may refine a the query by specifying additional information. For example, in response to receiving the first query at block 600, at block 625, one or more potential second queries 715 related to the first query 705 may be determined. The machine learning techniques implemented by the CPU 150 and/or the support server 127 may be utilized to determine the potential queries related to the first query 705. Metadata in the video content may be utilized by the machine learning techniques in determining potential queries related to a given first search query.

At block 630, the user interface 500 may be updated to depict one or more of the potential queries 715, as illustrated in FIG. 7A. For example, in response to the first scene command "who is on screen," the potential queries "other movies by john doe", "where was it filmed", etc. may be determined and depicted.

As described earlier, in some implementations, the user interface 700 may include a phrase control 710 that is updated in real-time to depict text associated with the commands issued by the user.

At block 635, the user 130 may indicate a second query that corresponds to one of the potential queries 615 to instruct the display apparatus 100 to depict information related to the query. The phrase control 610 may be updated in real-time to depict text associated with the first query 605 and the second query.

At block 640, objects related to the second query may be determined and included with or may replace the objects previously determined. Then the operations may repeat from block 610.

Figure 8:
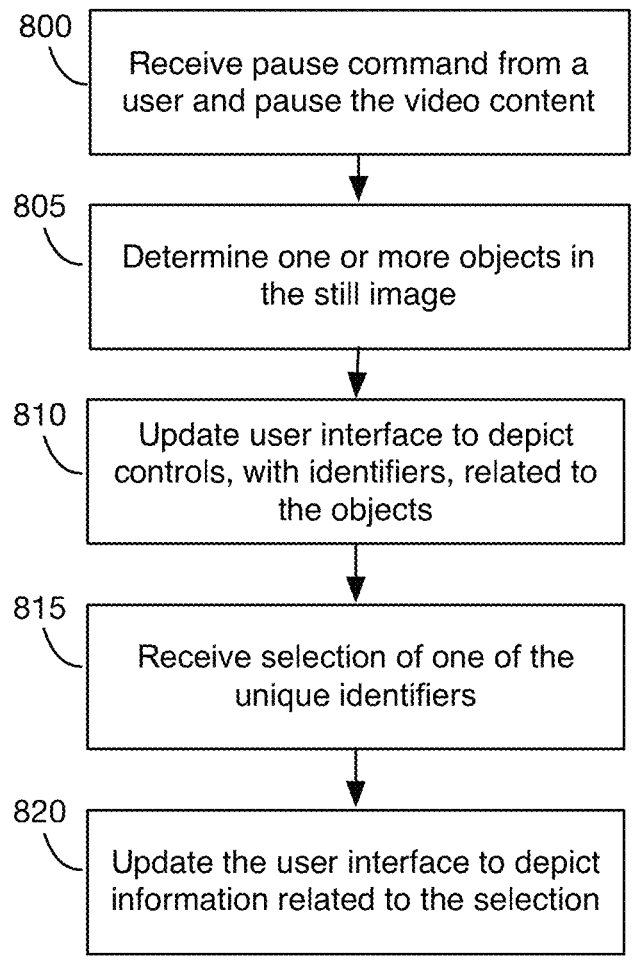
FIG. 8 illustrates alternative exemplary operations for determining information related to images in video content.

FIG. 8 illustrates alternative exemplary operations for determining information related to images in video content. The operations of FIG. 6 are better understood with reference to FIGS. 9A and 9B.

Figure 9A:
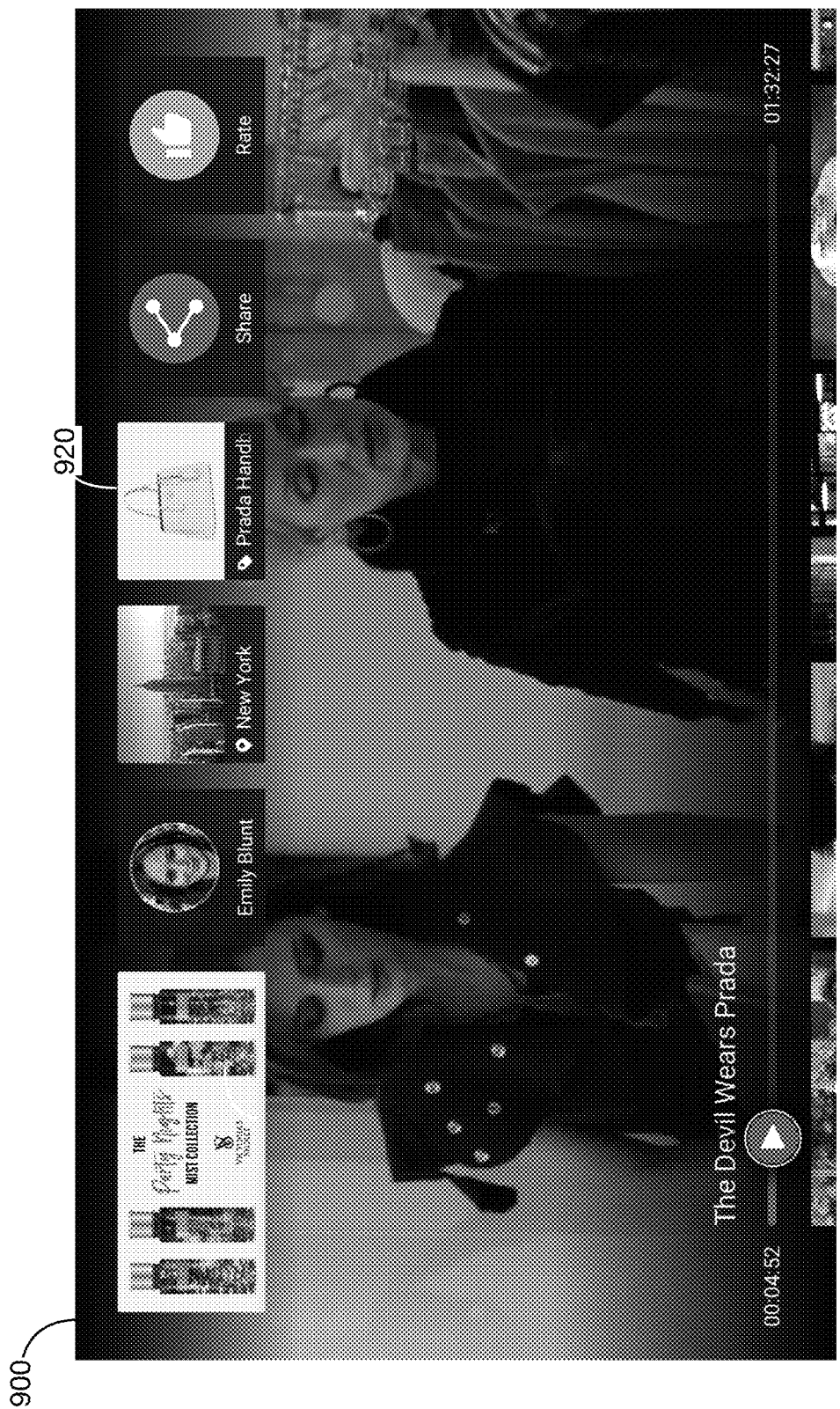
FIGS. 9A and 9B illustrate exemplary user interfaces that may be presented to a user during the operations of FIG. 8.

At block 800, the display apparatus 100 may be depicting video content, such as a sitcom, as illustrated in FIG. 9A. The user 130 may issue a command to the display apparatus 100 to pause the video content so that a still image is depicted on the user interface 900.

At block 805, the display apparatus 100 may determine one or more objects of the image. In this regard, the CPU 150 alone or in cooperation with the AI processor 165 may implement various machine learning techniques that utilize metadata associated with the video content to determine different objects being depicted in the still image. In addition or alternatively, the still image may be communicated to the support server 127 and the support server 127 may determine and convey different objects being depicted in the still image to the display apparatus 100.

At block 810, the user interface of the display apparatus 100 may be updated to depict controls 920 that facilitate selecting different objects, as illustrated in FIG. 9A. For example, controls 920 may be provided for selecting an advertisement related to one of the objects in the still image, to share the video content, to rate the video content, to display information related to one of the objects. Controls 920 for other aspects may be provided.

Each control 920 may include a unique identifier on or near the control 920 that facilitates selecting the control by voice.

At block 815, the user 130 may select one of the unique identifiers. For example, the user 130 may specify the unique identifier associated with a control depicting a handbag that corresponds to a handbag shown in the still image.

Figure 9B:
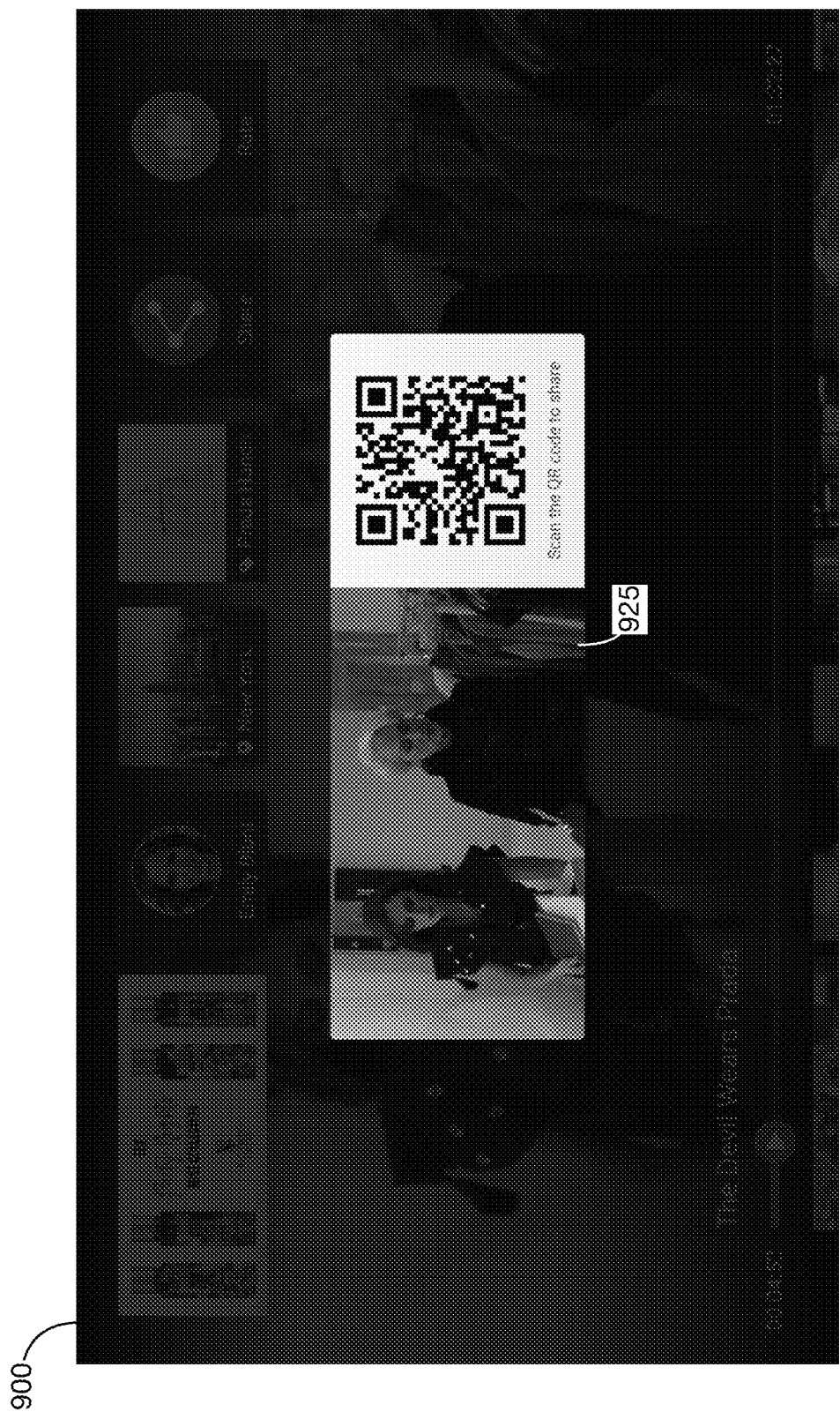

At block 820, the user interface 900 may be updated to depict information related to the selection. For example, as illustrated in FIG. 9B, an informational control 925 with information related to the selection may be provided. In one implementation, the informational control 925 may depict a QR code associated with a URL that may be utilized to find out more information related to the selection. The QR code facilitates navigation to the URL by scanning the QR code with an appropriate application on, for example, a mobile device.

Figure 10:
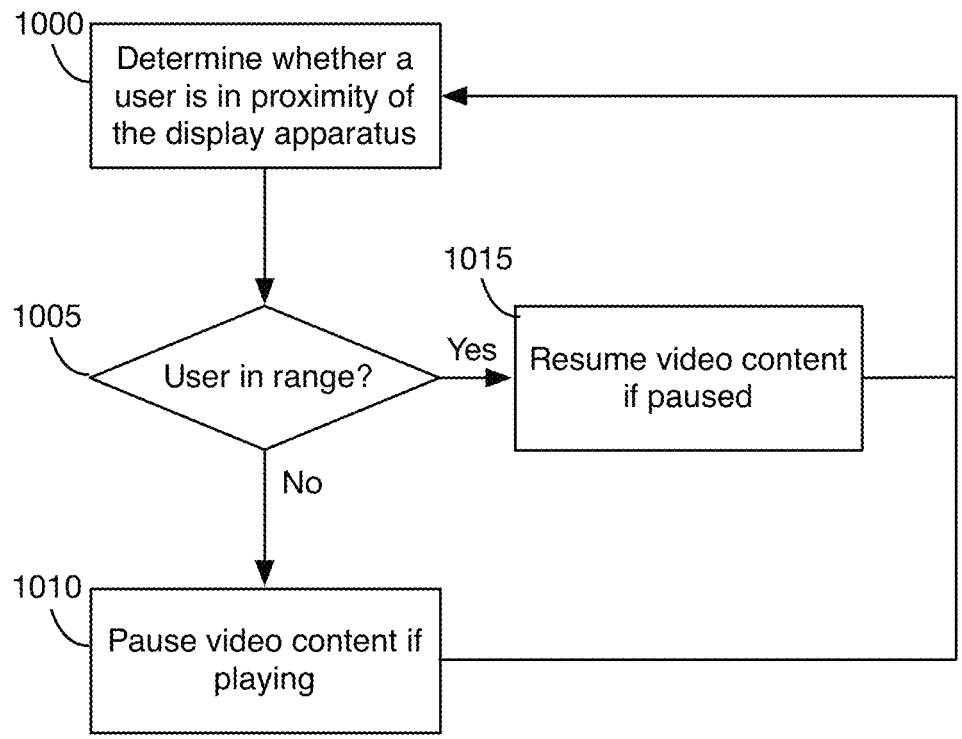
FIG. 10 illustrates alternative exemplary operations for automatically pausing video content.

FIG. 10 illustrates alternative exemplary operations for automatically pausing video content. The operations of FIG. 10 are better understood with reference to FIGS. 11A and 11B.

At block 1000, the display apparatus 100 may determine whether a user is in proximity of the display apparatus 100. For example, in one implementation, the imager 151 of the display apparatus 100 may capture images in front of the display apparatus. The CPU 150 alone or in cooperation with the AI processor 165 may control the imager 151 to capture an image, analyze the captured image to identify face data in the image, and compare the face data with face data associated with the user 130 to determine whether the user 130 is in proximity of the display apparatus. In this regard, face data associated with the user 130 may have been previously captured by the display apparatus 100 during, for example, an initial setup routine. The face data may have been stored to the support database 153.

In another implementation, near field communication circuitry of the display apparatus 100 may be utilized to detect the presence of a device in proximity to the display apparatus, carried by a user 130, that has near field communication capabilities. The device may have been previous registered with the display apparatus 100 as belonging to a particular user. Registration information may be stored to the support database 153.

Figure 11A:
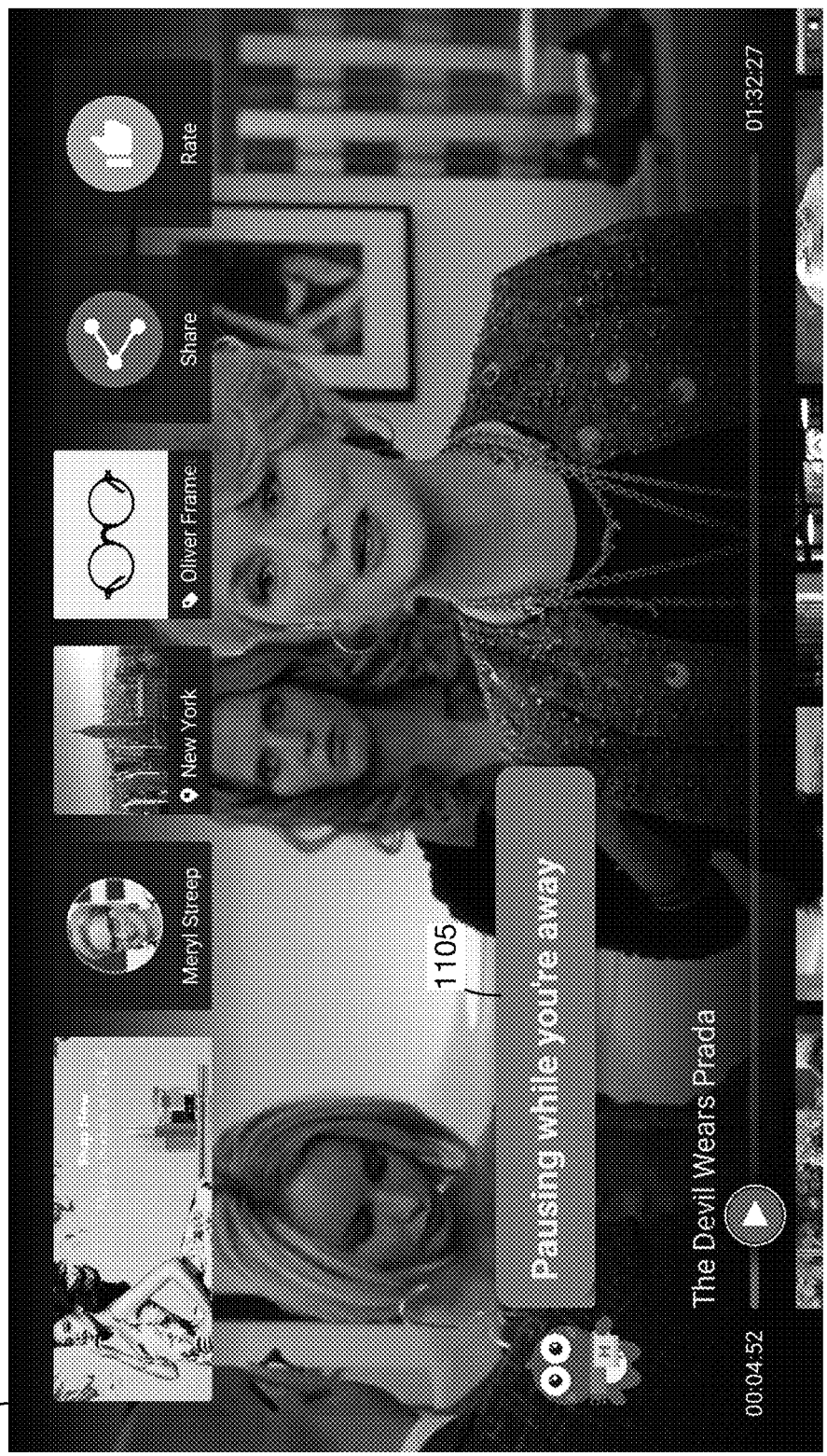
FIGS. 11A and 11B illustrate exemplary user interfaces that may be presented to a user during the operations of FIG. 10.

At block 1005, if the user is determined to not be in proximity of the display apparatus 100, then at block 1010, if the video content is not already paused, the video content may be paused, as illustrated in FIG. 11A. Referring to FIG. 11A, a status control 1105 may be depicted on the user interface 1100 to indicate that the video content has been paused.

In some implementations, the user interface 1100 may depict additional details related to a still image depicted on the user interface 1100 such as the information described above in relation to FIGS. 9A and 9B.

Figure 11B:
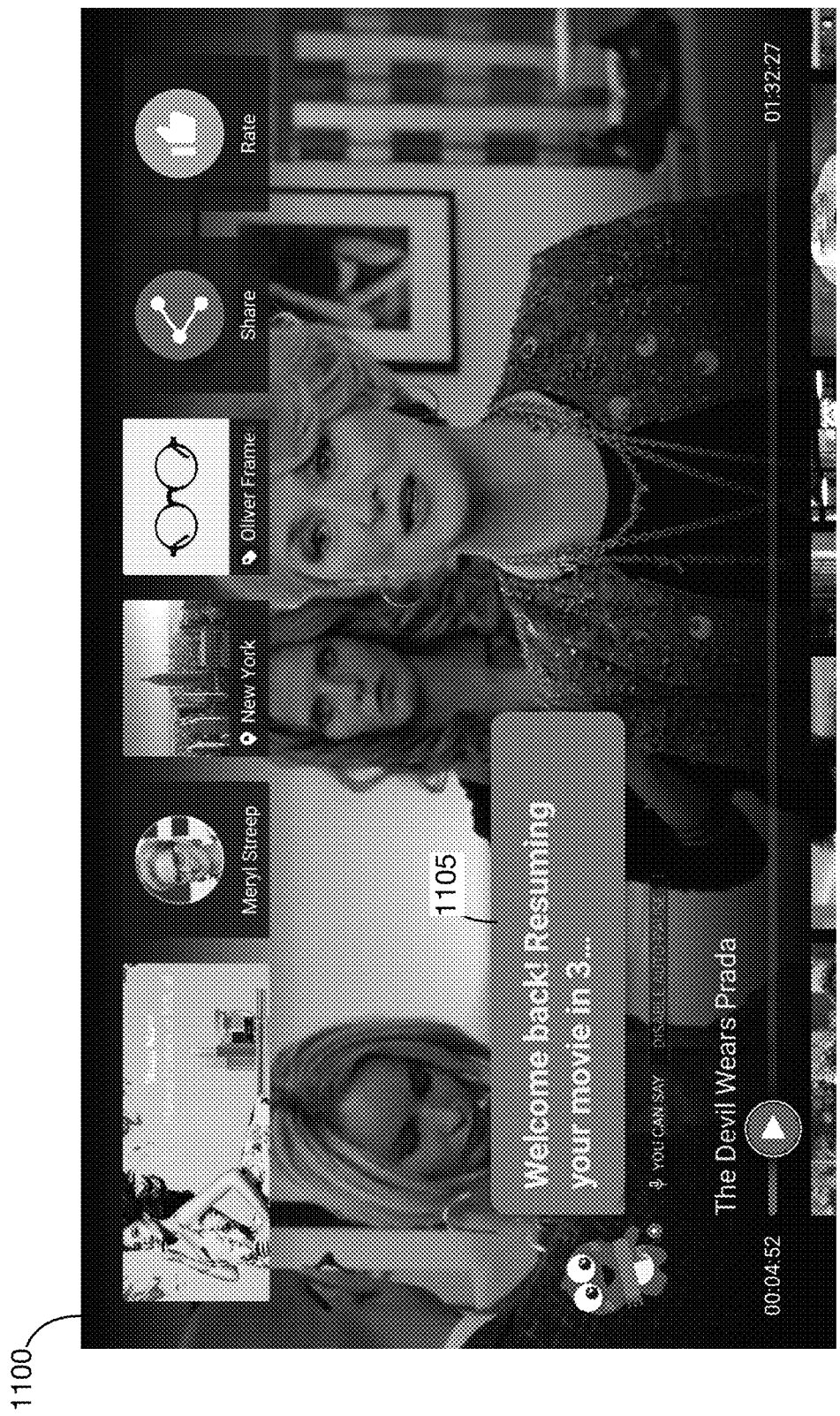

If at block 1005, the user 130 is determined to be in proximity of the display, then at block 1015, if the video content is not already resumed, the video content may be resumed, as illustrated in FIG. 11B. Referring to FIG. 11A, the status control 1105 may be updated to indicate that the video content will be resuming.

In some implementations, the display apparatus 100 may perform the operations above even when other users 130 are in proximity of the display apparatus 100. For example, in an initial state, a number of users 130 that includes a primary user 130 may be in proximity of the display apparatus. When the primary user is subsequently determined to not be in proximity of the display apparatus, the video content may be paused, as described above. When the primary user is subsequently determined to be in proximity of the display apparatus, the video content may be resumed.

Figure 12:
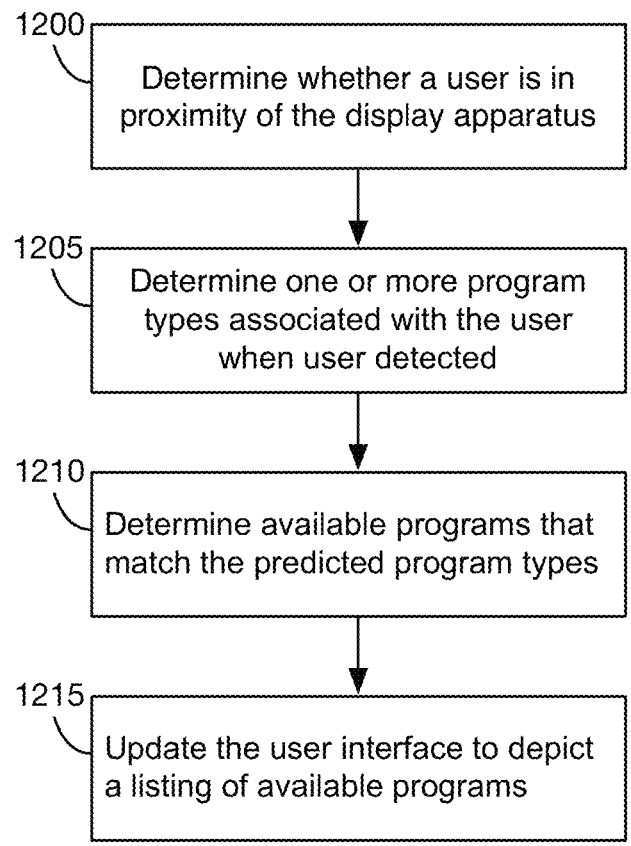
FIG. 12 illustrates alternative exemplary operations for automatically pausing video content.

FIG. 12 illustrates alternative exemplary operations for automatically pausing video content. The operations of FIG. 12 are better understood with reference to FIG. 13A-13D.

At block 1200, the display apparatus 100 may determine whether a user is in proximity of the display apparatus. For example, in one implementation, the imager 151 of the display apparatus 100 may capture images in front of the display apparatus. The CPU 150 alone or in cooperation with the AI processor 165 may control the imager 151 to capture an image, analyze the captured image to identify face data in the image, and compare the face data with face data associated the user to determine whether the user is in proximity of the display apparatus 100. As noted above, face data associated with the user 130 may have been previously captured by the display apparatus 100 during, for example, an initial setup routine.

In another implementation, the presence of the user 130 may be determined based on near field communication circuitry of a device carried the user 130, as described above.

At block 1205, if a user is determined to be in proximity of the display apparatus 100, then one or more program types associated with the user 130 are determined. In this regard, the CPU 150 alone or in cooperation with the AI processor 165 may implement various machine learning techniques to determine program types associated with the user 130. In addition or alternatively, information that identifies the user 130 may be communicated to the support server 127 and the support server 127 may determine program types associated with the user. The machine learning techniques may determine the program types associate with the user 130 by, for example, analyzing a history of programs viewed by the user 130, by receiving information from social media servers 120 related to likes and dislikes of the user, and/or by another manner.

At block 1210, programs that are available for watching at the time of user detection or within a predetermined time later (e.g., 30 minutes) may be determined. For example, metadata associated with available video content may be analyzed to determine whether any of the video content is related to the user associated program types determined above.

At block 1215, the user interface 1300 may be updated to present information 1305 related to available programs that match the user associated program types. The user interfaces 1300 may include controls that facilitate watching one of the available programs, recording the available programs, etc.

In some implementations, a group of users 130 may be detected within proximity of the display apparatus 100 and the program types determine at block 1205 may be based on the intersection of program types associated with two or more of the users 130. The user interface 1300 may be updated to depict information 1305 related to available programs that match the intersection of user associated program types.

In certain implementations, the operations above may be performed spontaneously when a user 130 is detected. For example, a first user 130 may be viewing video content on the display apparatus 100 when a second user comes within proximity of the display apparatus. The operations performed above may occur after detection of the second user.

In other implementations, the operations above may be performed immediately after powering on the display apparatus 100.

Figure 13A:
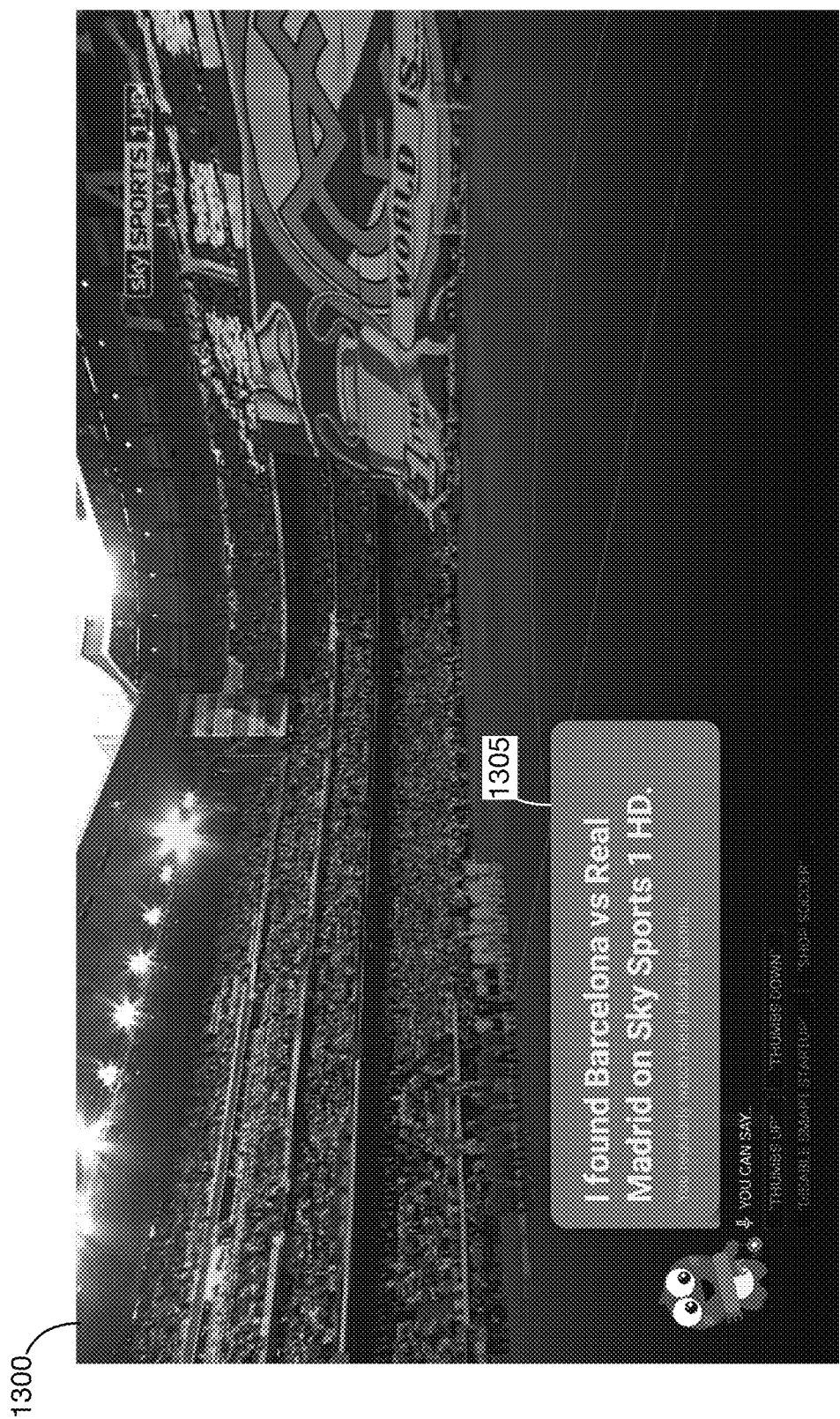
FIGS. 13A-13D illustrate exemplary user interfaces that may be presented to a user during the operations of FIG. 12.
Figure 13B:
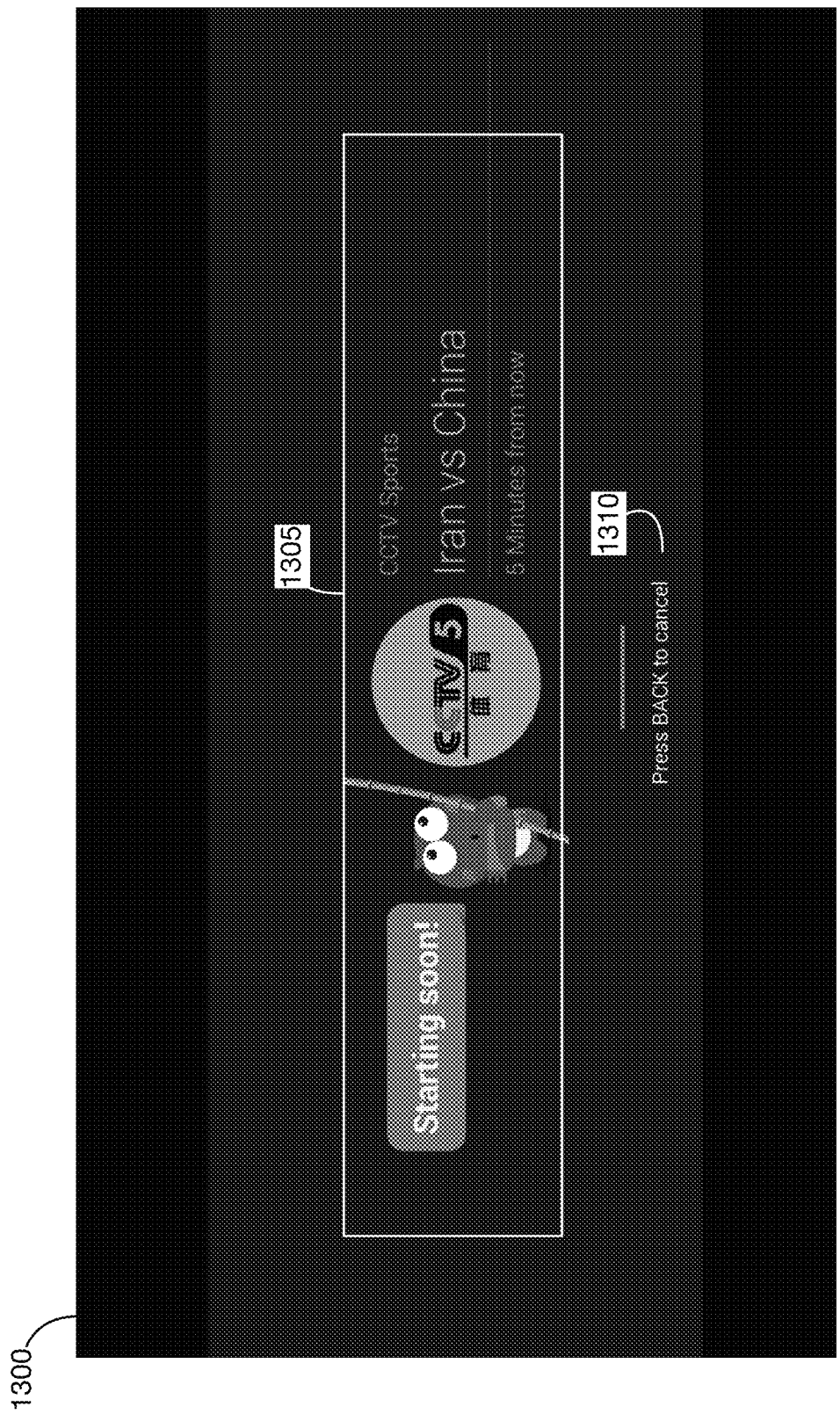

In yet other implementation, the operations may be performed after a power off indication has been received. For example, as illustrated in FIG. 13B, the display apparatus 100 may either power up after having been off or may cancel a power off operation, and the user interface 1300 may be updated to depict a minimal amount of information so as not to cause too much of a distraction. For example, the user interface 1300 may merely depict an informational control 1305 to make the user 130 aware of, for example, an upcoming program. A control 1310 may be provided to allow the user 130 to bring the display apparatus 100 into fully powered up condition to facilitate watching the program.

Figure 13C:
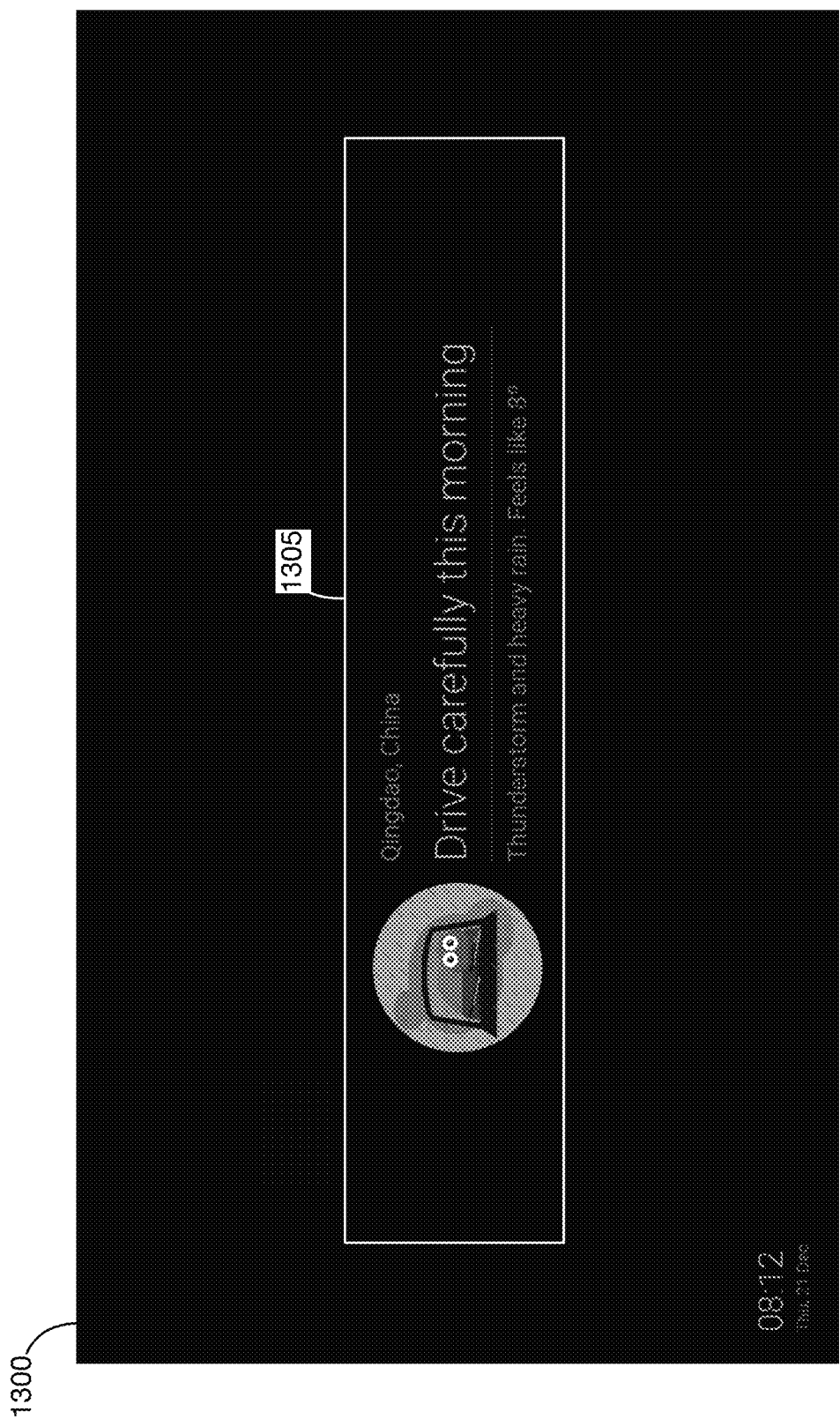
Figure 13D:
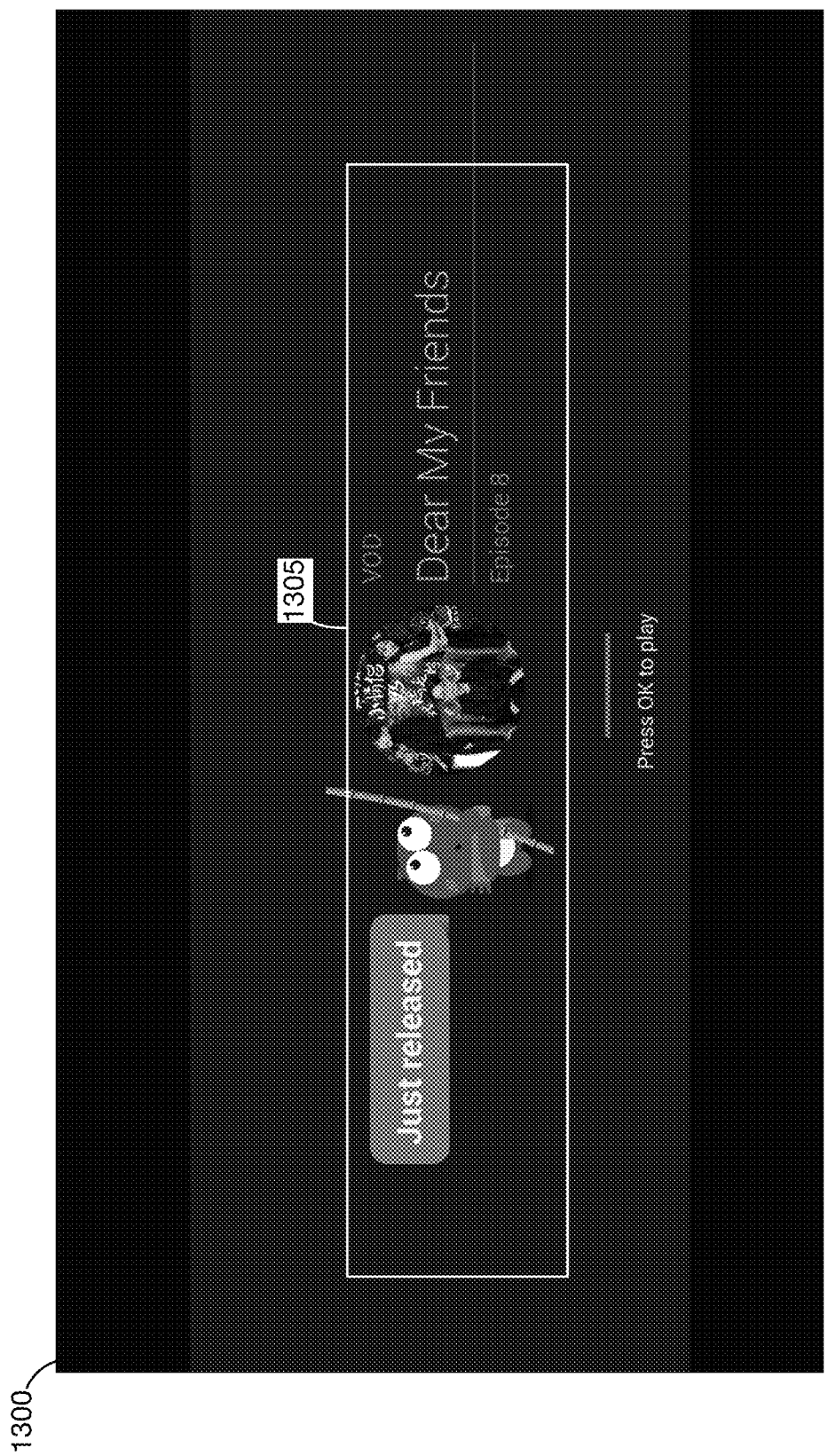

In yet other implementations, one or more information types associated with the user 130 may be determined and the user interface 1300 may be updated to depict information associated with the determined information types. For example, as illustrated in FIG. 13C, the user 130 may have been determined to be interested in knowing the weather. In this case, the display apparatus 100 may be powered up in a minimal power state and an informational control 1305 that displays information related to the weather may be depicted. Or the informational control 1305 may be updated to display information related to an upcoming television episode, as illustrated in FIG. 13D. After a pre-determined time (e.g., 1 minute) the display apparatus 100 may power down.

Figure 14:
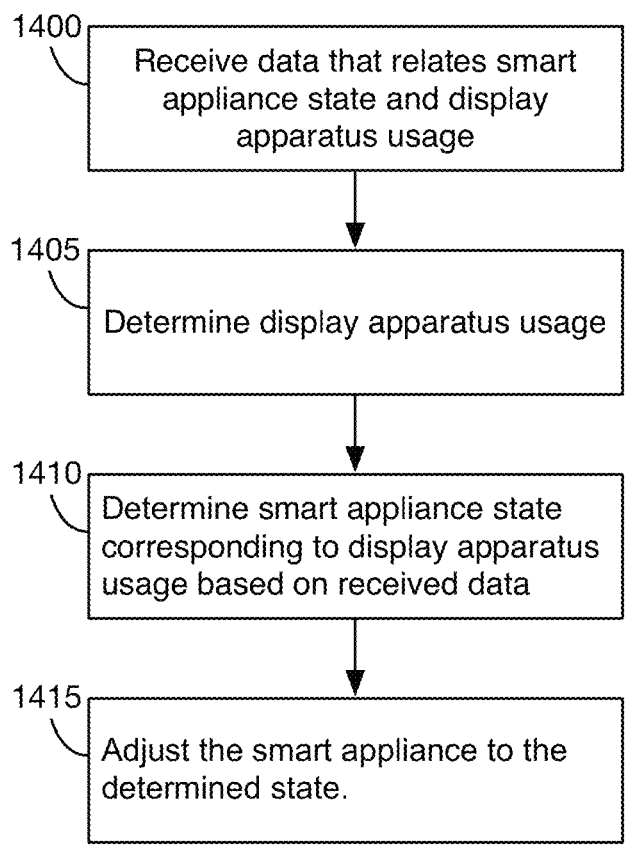
FIG. 14 illustrates exemplary operations for adjusting various smart appliances based on a detected routine of a user.

FIG. 14 illustrates exemplary operations for adjusting various smart appliances based on a detected routine of a user 130. The operations of FIG. 14 are better understood with reference to FIG. 15A-15B.

At block 1400, the display apparatus 100 may receive data that relates the state of various smart appliances 117 and display apparatus 100 usage. For example, data that relates light switches, timers, drapery controllers, and other smart appliances 117 that were previously related to display apparatus 100 usage may be received. In this regard, communication circuitry of the display apparatus 100 may continuously receive state information from smart appliances 117. The support database 153 may store the state information of the smart appliances 117 along with usage information of the display apparatus 100. The CPU 150 may correlate the state information of the smart appliances 117 and the usage information of the display apparatus 100 to form a relation between the state of the smart appliances and the display apparatus usage. The relation may be indicative of a routine that the user 130 follows in watching video content on the display apparatus 100.

The state information may define an activation state of the smart appliance 117. For example, whether a smart light was on, off, or dimmed to a particular setting such as 50%. Other information may include whether smart drapes were closed, partially closed, etc. The usage information may define times of usage of the display apparatus, program types viewed on the display apparatus, lists of specific users of the display apparatus, and specific characteristics of the display apparatus 100 such as volume, contrast, and brightness of the display apparatus, etc.

At block 1405, the display apparatus usage may be determined, and at block 1410, corresponding states for one or more smart appliances 117 may be determined based on the received data. For example, the display apparatus usage may indicate that the display apparatus 100 is set to a movie channel, that the picture controls have been set to a cinema mode and that the display apparatus 100 is being used in the evening on a Friday night. The smart appliance state/display apparatus usage correlation data may indicate that under these conditions, the lights of the room where the display apparatus 100 is located are typically off and that the blinds are closed.

At block 1415, the state of the various smart appliances may be set according to the state determined at block 1410. For example, the CPU 150 may, via the communication circuitry of the display apparatus 100, adjust the various smart appliances 117.

Figure 15A:
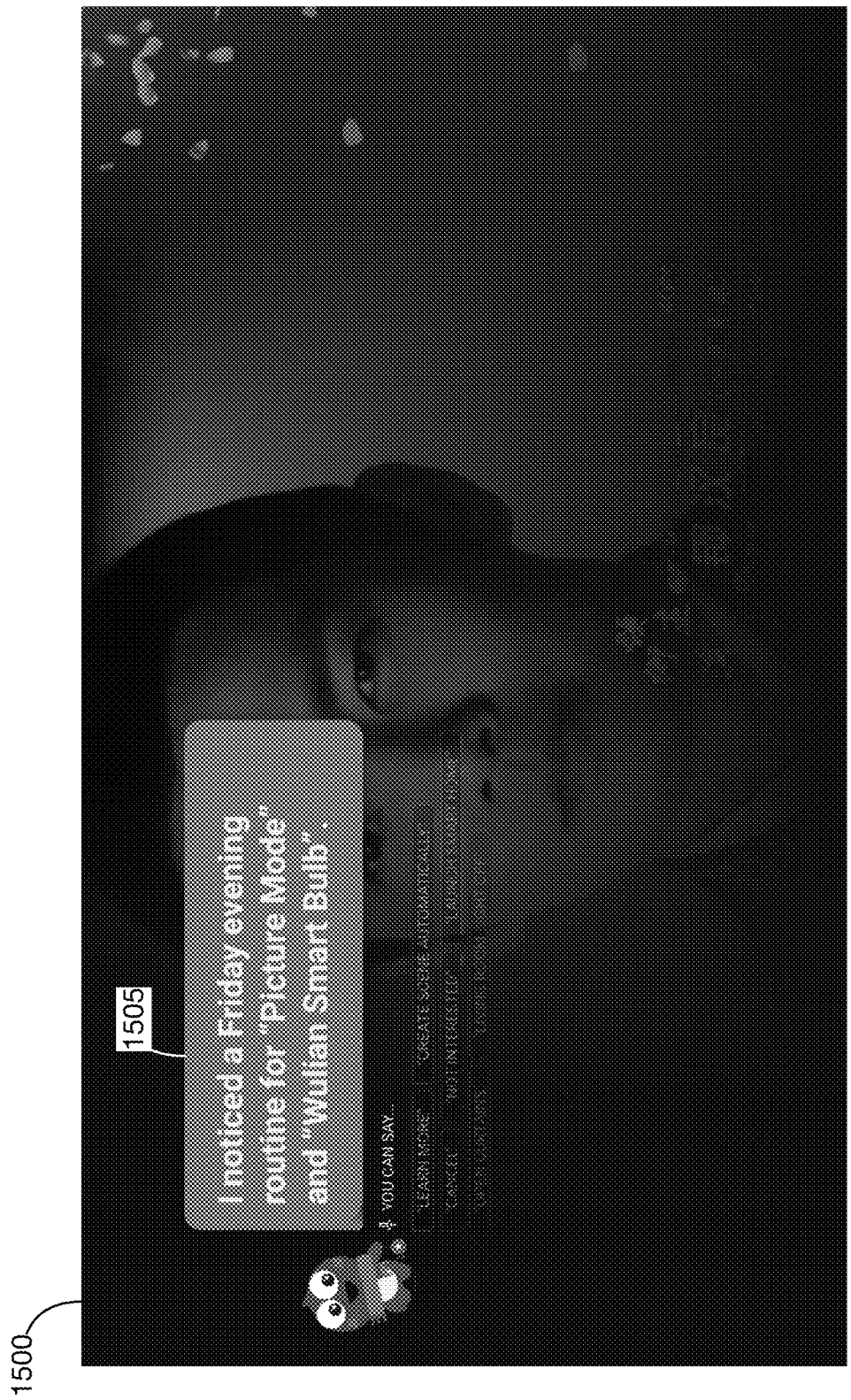
FIGS. 15A-15B illustrate exemplary user interfaces that may be presented to a user during the operations of FIG. 14.
Figure 15B:
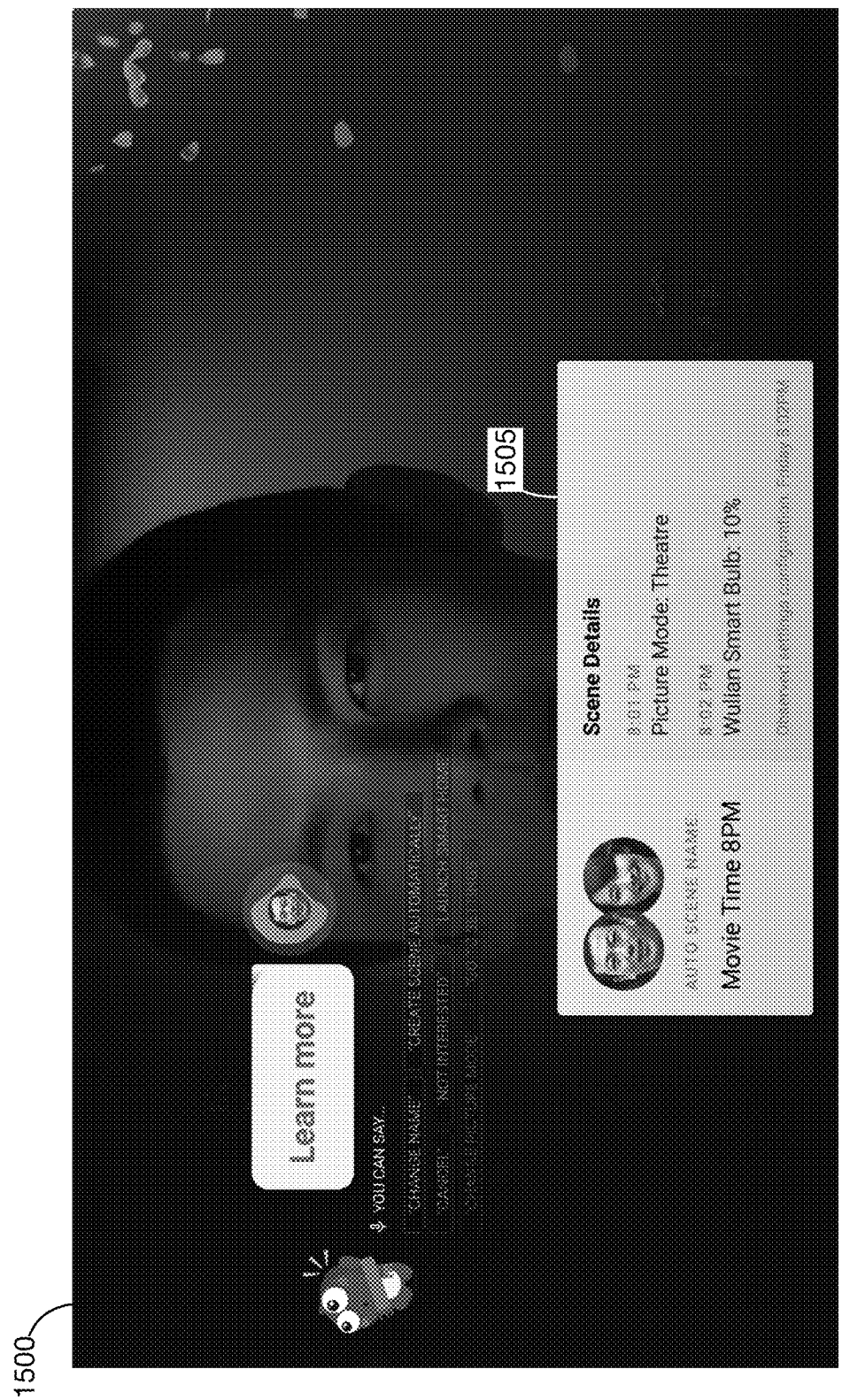

As illustrated in FIG. 15A, the user interface 1500 may include an informational control 1505 to notify the user 130 that a routine was detected. For example, the user interface 1500 may note that that the display apparatus 100 is in a "picture mode" and that a smart bulb is controlled when the display apparatus 100 is in this mode. As illustrated in FIG. 15B, the user interface 1500 may be updated to provided details related to the detected routine such as a name assigned for the routine (e.g., "Movie Time 8 PM"), a time when the mode "picture mode" was entered (e.g., 8:01 PM) and a setting to set the smart appliance to. (E.g., 10%).

Figure 16:
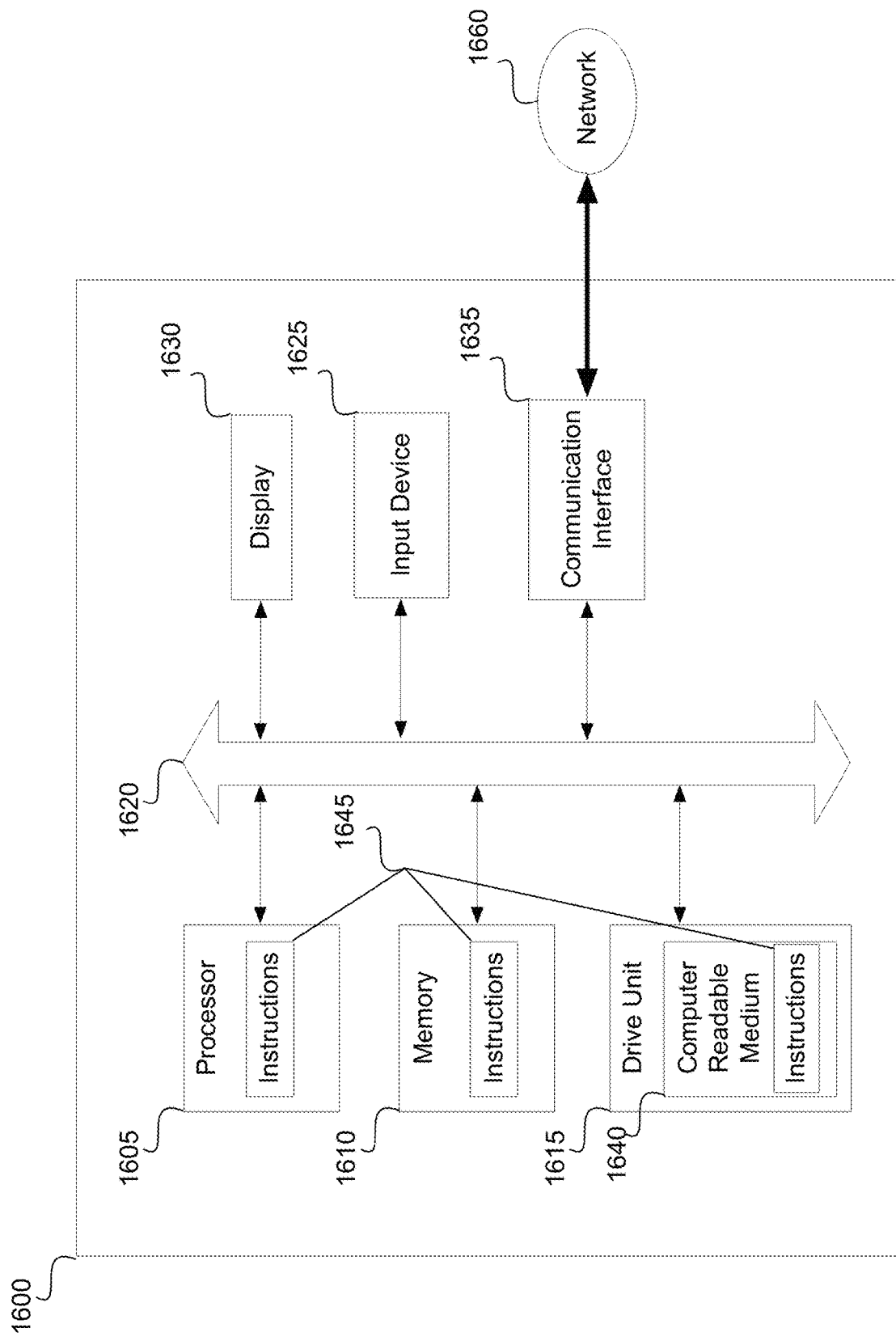
FIG. 16 illustrates an exemplary computer system that may form part of or implement the systems described in the figures or in the following paragraphs.

FIG. 16 illustrates a computer system 1600 that may form part of or implement the systems, environments, devices, etc., described above. The computer system 1600 may include a set of instructions 1645 that the processor 1605 may execute to cause the computer system 1600 to perform any of the operations described above. The computer system 1600 may operate as a stand-alone device or may be connected, e.g., using a network, to other computer systems or peripheral devices.

In a networked deployment, the computer system 1600 may operate in the capacity of a server or as a client computer in a server-client network environment, or as a peer computer system in a peer-to-peer (or distributed) environment. The computer system 1600 may also be implemented as or incorporated into various devices, such as a personal computer or a mobile device, capable of executing instructions 1645 (sequential or otherwise) causing a device to perform one or more actions. Further, each of the systems described may include a collection of subsystems that individually or jointly execute a set, or multiple sets, of instructions to perform one or more computer operations.

The computer system 1600 may include one or more memory devices 1610 communicatively coupled to a bus 1620 for communicating information. In addition, code operable to cause the computer system to perform operations described above may be stored in the memory 1610. The memory 1610 may be a random-access memory, read-only memory, programmable memory, hard disk drive or any other type of memory or storage device.

The computer system 1600 may include a display 1630, such as a liquid crystal display (LCD), a cathode ray tube (CRT), or any other display suitable for conveying information. The display 1630 may act as an interface for the user to see processing results produced by processor 1605.

Additionally, the computer system 1600 may include an input device 1625, such as a keyboard or mouse or touchscreen, configured to allow a user to interact with components of system 1600.

The computer system 1600 may also include a disk or optical drive unit 1615. The drive unit 1615 may include a computer-readable medium 1640 in which the instructions 1645 may be stored. The instructions 1645 may reside completely, or at least partially, within the memory 1610 and/or within the processor 1605 during execution by the computer system 1600. The memory 1610 and the processor 1605 also may include computer-readable media as discussed above.

The computer system 1600 may include a communication interface 1635 to support communications via a network 1650. The network 1650 may include wired networks, wireless networks, or combinations thereof. The communication interface 1635 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A display apparatus comprising:
user input circuitry for receiving user commands;
a display for displaying video content and a user interface;
a processor in communication with the user input circuitry and the display; and
non-transitory computer readable media in communication with the processor that stores instruction code, which when executed by the processor, causes the processor to:
receive, from the user input circuitry, a first scene query from the user input circuitry while displaying the video content, wherein the first scene query comprises a voice command from a user;
recognize the first scene query by voice recognition and depict a first phrase that corresponds to the first scene query in real-time as the voice command is being received from the user;
determine a sequence of video segments in time within the video content that are related to a type of scene associated with the first scene query;
update the user interface to depict scene images corresponding to the sequence of video segments, where the scene images are associated with unique identifiers for facilitating voice control; and
in response to receiving a second scene query in voice following the first scene query, perform voice recognition of the second voice scene query, depict a second phrase corresponding to the second scene query that follows the first phrase as a further query of the first scene query, and interpret, using a machine learning technique, the second scene query as hierarchical supplemental information to the first scene query to refine potential scene command related to the first scene query and to select and depict scene images corresponding to a sub-group of the sequence of video segments within the video content.

2. The display apparatus according to claim 1, wherein the instruction code causes the processor to:
receive, from the user input circuitry, a selection command that specifies one of the unique identifiers; and
display a video segment in the sequence of video segments that is associated with the specified unique identifier.

3. The display apparatus according to claim 2, wherein the selection command corresponds to a voice command.

4. The display apparatus according to claim 1, wherein the video content include metadata that defines a hierarchy of queries.

5. The display apparatus according to claim 1, wherein the second phrase is updated in real-time as the user specifies the second scene query.

6. The display apparatus according to claim 5, wherein the instruction code causes the processor to determine another sequence of video segments in the video content that are related to another type of scene associated with the first scene query and the second scene query.

7. The display apparatus according to claim 6, wherein the instruction code causes the processor to convey the first scene query and the second scene query to a support server.

8. A method for controlling a display apparatus comprising:
receiving, via user input circuitry, user commands;
displaying video content, the video content and a user interface;
receiving, from the user input circuitry, a first scene query from the user input circuitry while displaying the video content, wherein the first scene query comprises a voice command from a user;
recognizing the first scene query by voice recognition and depicting a first phrase that corresponds to the first scene query in real-time as the voice command is being received from the user;
determining a sequence of video segments in time within the video content that are related to a type of scene associated with the first scene query;
updating the user interface to depict scene images corresponding to the sequence of video segments, where the scene images are associated with unique identifiers for facilitating voice control; and
in response to receiving a second scene query in voice following the first scene query, performing voice recognition of the second voice scene query, depict a second phrase corresponding to the second scene query that follows the first phrase as a further query of the first scene query, and interpreting, using a machine learning technique, the second scene query as hierarchical supplemental information to the first scene query to refine potential scene command related to the first scene query and to select and depict scene images corresponding to a sub-group of the sequence of video segments within the video content.

9. The method according to claim 8, further comprising:
receiving, from the user input circuitry, a selection command that specifies one of the unique identifiers;
displaying a video segment in the sequence of video segments that is associated with the specified unique identifier.

10. The method according to claim 9, wherein the selection command corresponds to a voice command.

11. The method according to claim 8, wherein the video content include metadata that defines a hierarchy of queries.

12. The method according to claim 8,
wherein the second phrase is updated in real-time as the user specifies the second scene query.

13. The method according to claim 12, further comprising determining another sequence of video segments in the video content that are related to another type of scene associated with the first scene query and the second scene query.

14. The method according to claim 13, wherein further comprising conveying the first scene query and the second scene query to a support server.

15. A non-transitory computer readable media that stores instruction code for controlling a display apparatus, the instruction code being executable by a machine for causing the machine to:
display a video content and a user interface;
receive, from a user input circuitry of the machine, a first scene query from the user input circuitry while displaying the video content, wherein the first scene query comprises a voice command from a user;
recognize the first scene query by voice recognition and depicting a first phrase that corresponds to the first scene query in real-time as the voice command is being received from the user;
determine a sequence of video segments in time within the video content that are related to a type of scene associated with the first scene query;
update the user interface to depict scene images corresponding to the sequence of video segments, where the scene images are associated with unique identifiers for facilitating voice control; and
in response to receiving a second scene query in voice following the first scene query, perform voice recognition of the second voice scene query, depict a second phrase corresponding to the second scene query that follows the first phrase as a further query of the first scene query, and interpret, using a machine learning technique, the second scene query as hierarchical supplemental information to the first scene query to refine potential scene command related to the first scene query and to select and depict scene images corresponding to a sub-group of the sequence of video segments within the video content.

16. The non-transitory computer readable media according to claim 15, wherein the instruction code causes the machine to:
receive, from the user input circuitry, a selection command that specifies one of the unique identifiers; and
display a video segment in the sequence of video segments that is associated with the specified unique identifier.

17. The non-transitory computer readable media according to claim 16, wherein the selection command corresponds to a voice command.

* * * * *